(12) United States Patent
Yoon

(10) Patent No.: US 11,579,683 B2
(45) Date of Patent: Feb. 14, 2023

(54) WEARABLE DEVICE AND CONTROL METHOD THEREFOR

(71) Applicant: SAMSUNG ELECTRONICS CO., LTD., Suwon-si (KR)

(72) Inventor: Chiyul Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/973,342

(22) PCT Filed: Jan. 3, 2019

(86) PCT No.: PCT/KR2019/000100
§ 371 (c)(1),
(2) Date: Dec. 8, 2020

(87) PCT Pub. No.: WO2020/040367
PCT Pub. Date: Feb. 27, 2020

(65) Prior Publication Data
US 2021/0247840 A1   Aug. 12, 2021

(30) Foreign Application Priority Data

Aug. 21, 2018 (KR) .................. 10-2018-0097266

(51) Int. Cl.
*G06F 3/01* (2006.01)
*G06F 1/16* (2006.01)
(52) U.S. Cl.
CPC .............. *G06F 3/011* (2013.01); *G06F 1/163* (2013.01); *G06F 3/013* (2013.01)
(58) Field of Classification Search
CPC ........... G06F 1/163; G06F 3/013; G06F 3/011
See application file for complete search history.

(56) References Cited

U.S. PATENT DOCUMENTS 9,576,399 B2 * 2/2017 Lo ........................... G06F 3/013
2006/0232665 A1 * 10/2006 Schowengerdt ... H04N 5/23219
348/E13.067

(Continued)

FOREIGN PATENT DOCUMENTS

KR  10-2013-0034125 A   4/2013
KR  10-2013-0139280 A  12/2013
(Continued)

OTHER PUBLICATIONS

International Search Report (PCT/ISA/210) issued by the International Searching Authority in International Application No. PCT/KR2019/000100, dated May 3, 2019.
(Continued)

*Primary Examiner* — Yu Chen
(74) *Attorney, Agent, or Firm* — Sughrue Mion, PLLC

(57) ABSTRACT

A wearable device is disclosed. The wearable device comprises: a camera; a sensor; a display; a laser projector; and a processor for identifying a user's sight line on the basis of sensing data obtained by the sensor, identifying location information of at least one object included in an image obtained by the camera, and controlling the laser projector to provide, on the display, augmented reality (AR) information related to the object on the basis of the identified user's sight line and location information of the object, wherein the laser projector comprises: a light emitting element for emitting a laser light; a focus adjusting element for adjusting a focus of the emitted laser light; and a scanning mirror for controlling a scan direction of the light having the adjusted focus, and the processor controls a driving state of the focus adjusting element on the basis of the identified user's sight line and location information of the object.

7 Claims, 21 Drawing Sheets

<MOVEMENT PATH 2 OF SCANNING MIRROR WHEN FOCUS ADJUSTING ELEMENT IS PROVIDED>

(56) References Cited

U.S. PATENT DOCUMENTS

| | | | |
|---|---|---|---|
| 2008/0117289 A1* | 5/2008 | Schowengerdt | G02B 26/005 |
| | | | 348/E13.032 |
| 2012/0113092 A1* | 5/2012 | Bar-Zeev | G02B 27/0101 |
| | | | 345/419 |
| 2014/0132484 A1 | 5/2014 | Pandey et al. | |
| 2016/0018645 A1 | 1/2016 | Haddick et al. | |
| 2016/0139411 A1* | 5/2016 | Kang | A61B 3/14 |
| | | | 359/630 |
| 2016/0150201 A1* | 5/2016 | Kilcher | G02B 26/101 |
| | | | 348/745 |
| 2016/0328884 A1 | 11/2016 | Schowengerdt et al. | |
| 2017/0160518 A1* | 6/2017 | Lanman | G02B 7/287 |
| 2018/0059420 A1* | 3/2018 | Woo | G02B 27/017 |
| 2018/0095284 A1* | 4/2018 | Welch | G02B 27/0172 |
| 2018/0239145 A1* | 8/2018 | Lanman | G06F 3/013 |
| 2018/0275410 A1* | 9/2018 | Yeoh | G06T 15/00 |
| 2019/0179409 A1* | 6/2019 | Jones | G06F 3/011 |
| 2019/0287495 A1* | 9/2019 | Mathur | G06T 15/00 |
| 2020/0201428 A1 | 6/2020 | Yoon et al. | |

FOREIGN PATENT DOCUMENTS

| | | |
|---|---|---|
| KR | 10-2016-0059406 A | 5/2016 |
| KR | 10-2017-0087874 A | 7/2017 |
| KR | 10-1844883 B1 | 4/2018 |
| KR | 10-2019-0034029 A | 4/2019 |

OTHER PUBLICATIONS

Written Opinion (PCT/ISA/237) issued by the International Searching Authority in International Application No. PCT/KR2019/000100, dated May 3, 2019.

Communication dated Aug. 26, 2021, issued by the European Patent Office in European Application No. 19852488.6.

Communication dated May 12, 2022 by the European Patent Office in European Patent Application No. 19852488.6.

* cited by examiner

<GAZE FIXED ON VEHICLE ON LEFT SIDE>

<GAZE FIXED ON BUILDING ON RIGHT SIDE>

<GAZE FIXED ON VEHICLE ON LEFT SIDE AFTER WEARING WEARABLE DEVICE>

<GAZE FIXED ON BUILDING ON RIGHT SIDE AFTER WEARING WEARABLE DEVICE>

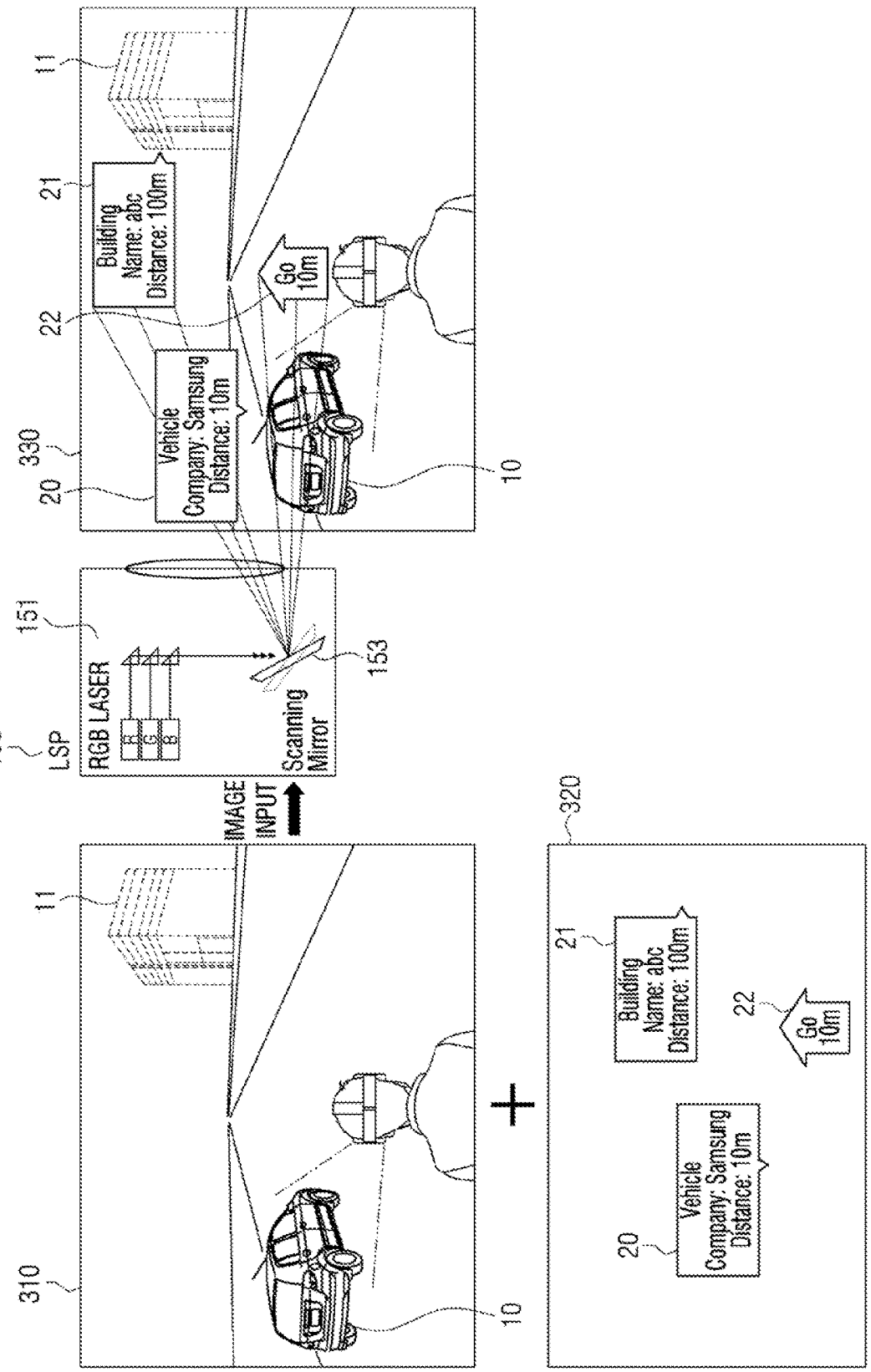

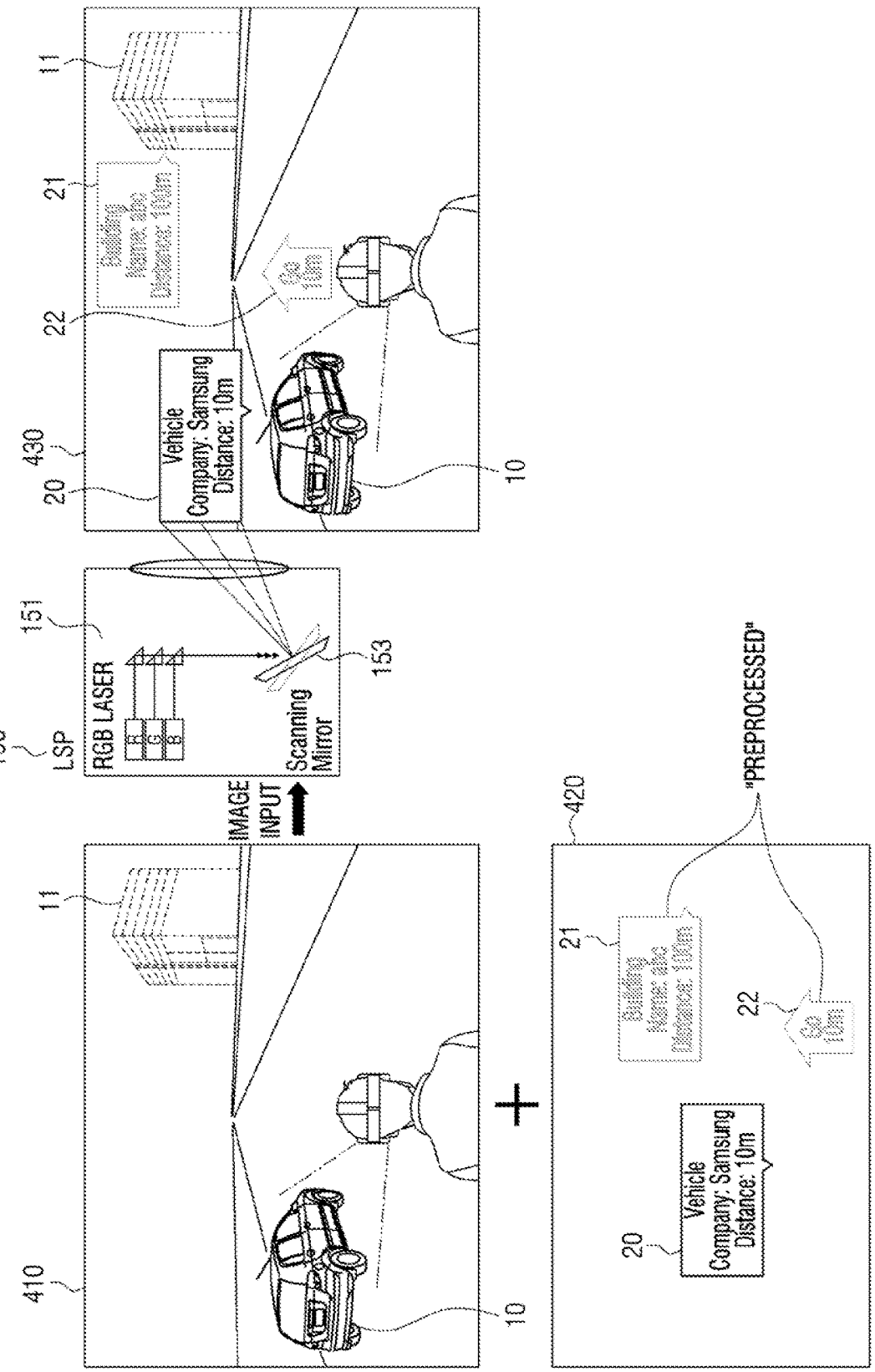

FIG. 11
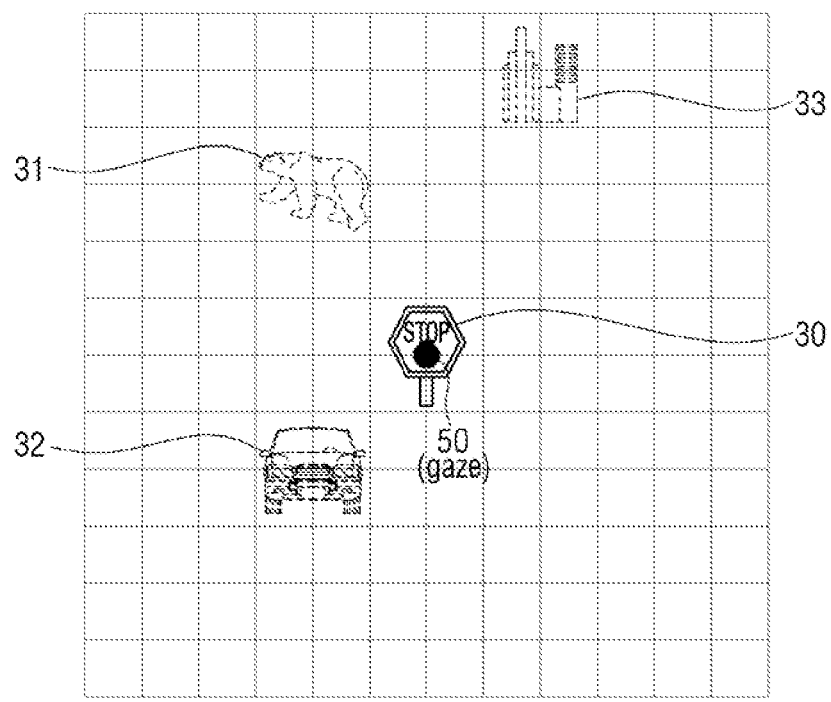
<LOCATIONS OF OBJECTS AND USER'S GAZE>

FIG. 12
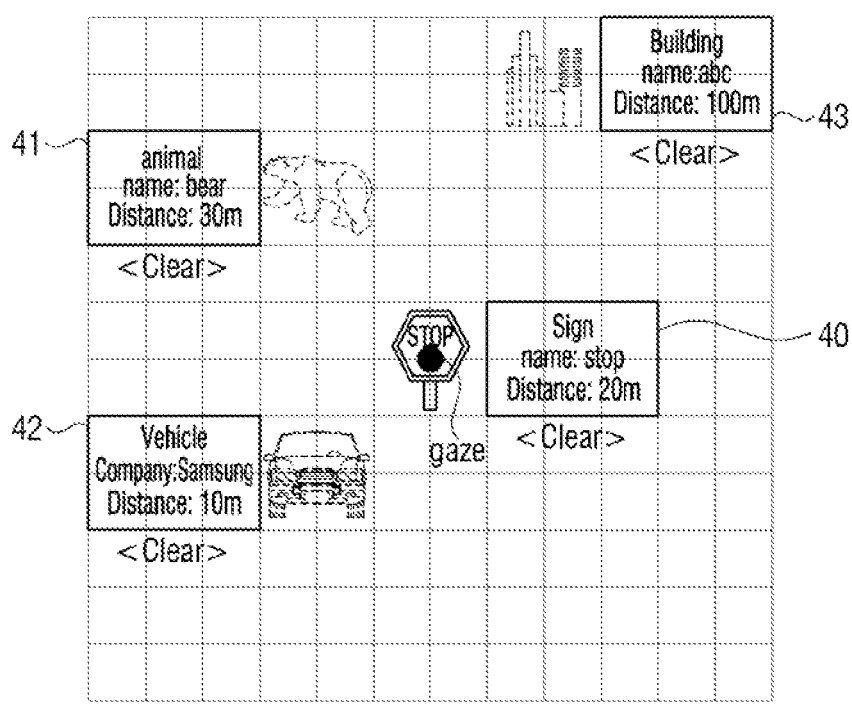
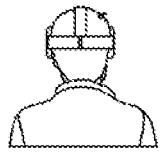
<DISPLAY OF AR INFORMATION WHEN FOCUS ADJUSTING ELEMENT IS NOT PROVIDED>

FIG. 13
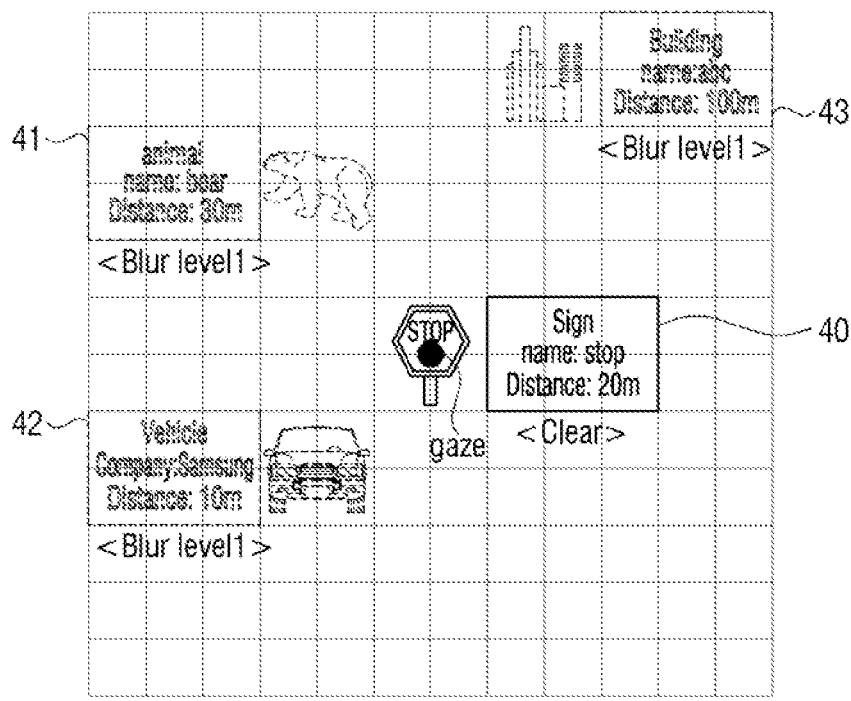
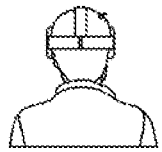
<DISPLAY OF AR INFORMATION BY DIVIDING SHARPNESS INTO TWO LEVELS, WHEN FOCUS ADJUSTING ELEMENT IS PROVIDED>
(a)
| OBJECT | AR INFORMATION NUMBER | USER'S GAZE | FOCAL LENGTH DIFFERENCE | SHARPNESS |
|---|---|---|---|---|
| Sign(30) | 40 | Sign | 0 | Clear |
| Animal(31) | 41 | Sign | 10 | Blur level 1 |
| Vehicle(32) | 42 | Sign | -10 | Blur level 1 |
| Building(33) | 43 | Sign | 80 | Blur level 1 |
(b)

FIG. 14

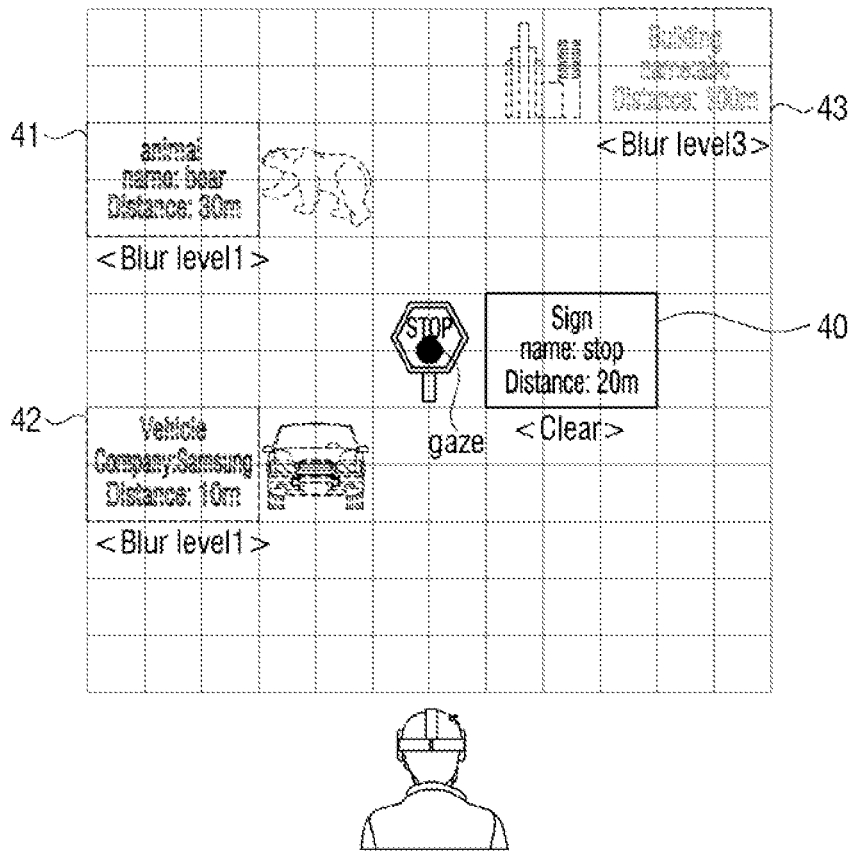

<DISPLAY OF AR INFORMATION BY DIVIDING SHARPNESS INTO PLURALITY OF LEVELS, WHEN FOCUS ADJUSTING ELEMENT IS PROVIDED>

(a)

| FOCAL LENGTH DIFFERENCE (ABSOLUTE VALUE) | SHARPNESS |
|---|---|
| 0~5 | Clear |
| 6~30 | Blur level 1 |
| 31~50 | Blur level 2 |
| 51~100 | Blur level 3 |
| 101~ | None |

| OBJECT | AR INFORMATION NUMBER | USER'S GAZE | FOCAL LENGTH DIFFERENCE | SHARPNESS |
|---|---|---|---|---|
| Sign(30) | 40 | Sign | 0 | Clear |
| Animal(31) | 41 | Sign | 10 | Blur level 1 |
| Vehicle(32) | 42 | Sign | -10 | Blur level 1 |
| Building(33) | 43 | Sign | 80 | Blur level 3 |

(b)

FIG. 15
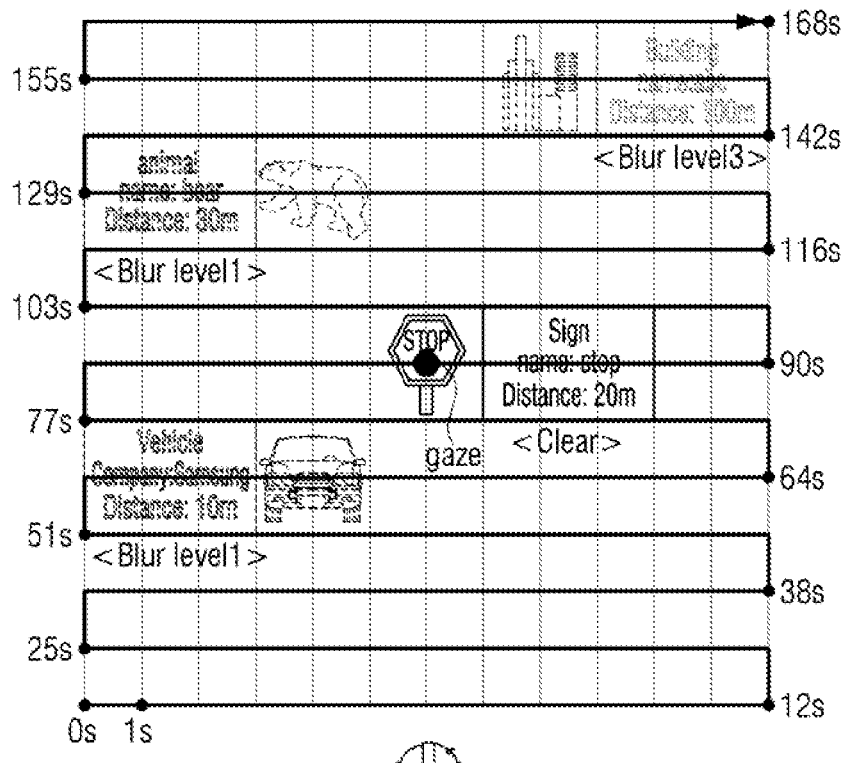
<NORMAL MOVEMENT PATH OF NORMAL SCANNING MIRROR, WHEN FOCUS ADJUSTING ELEMENT IS PROVIDED>
(a)
AMOUNT OF CHANGE OF FOCUS ADJUSTING ELEMENT
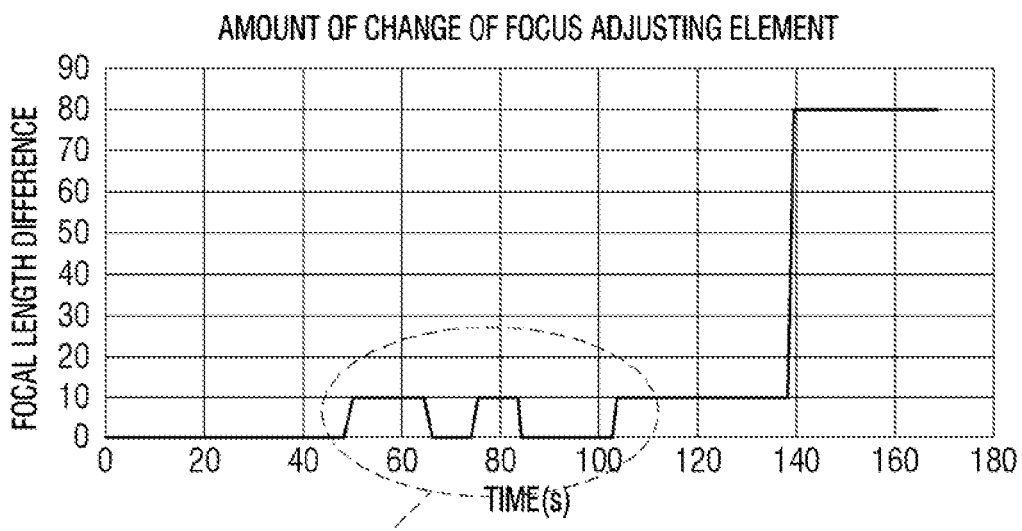
ESSENTIAL TO USE HIGH-SPEED FOCUS ADJUSTING ELEMENT
(b)

FIG. 16
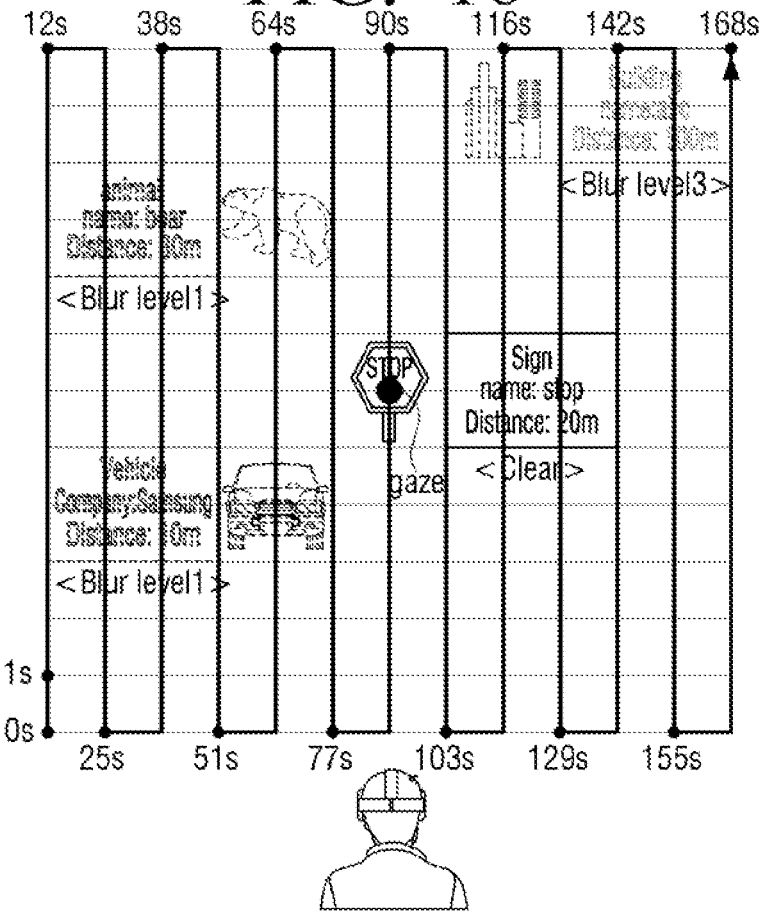
<NORMAL MOVEMENT PATH OF SCANNING MIRROR, WHEN FOCUS ADJUSTING ELEMENT IS PROVIDED>
(a)
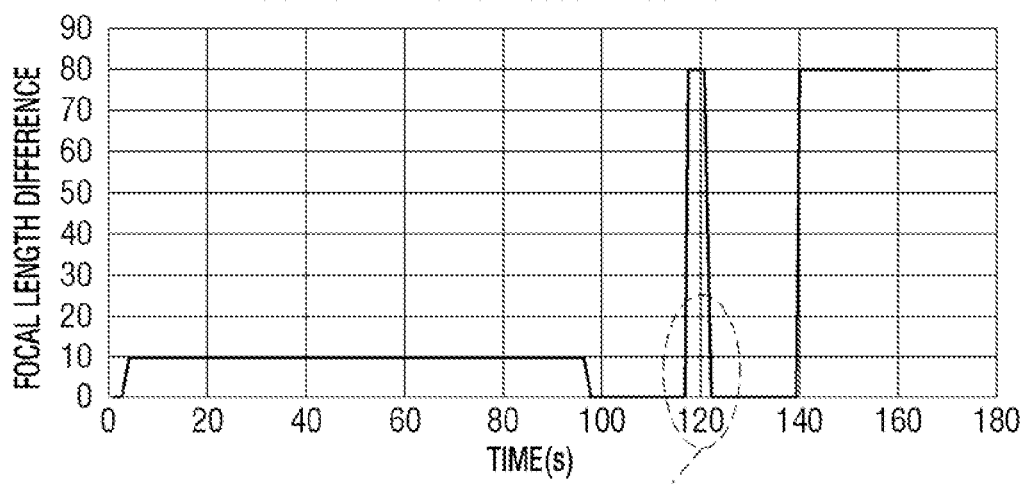
ESSENTIAL TO USE HIGH-SPEED FOCUS ADJUSTING ELEMENT
(b)

FIG. 17
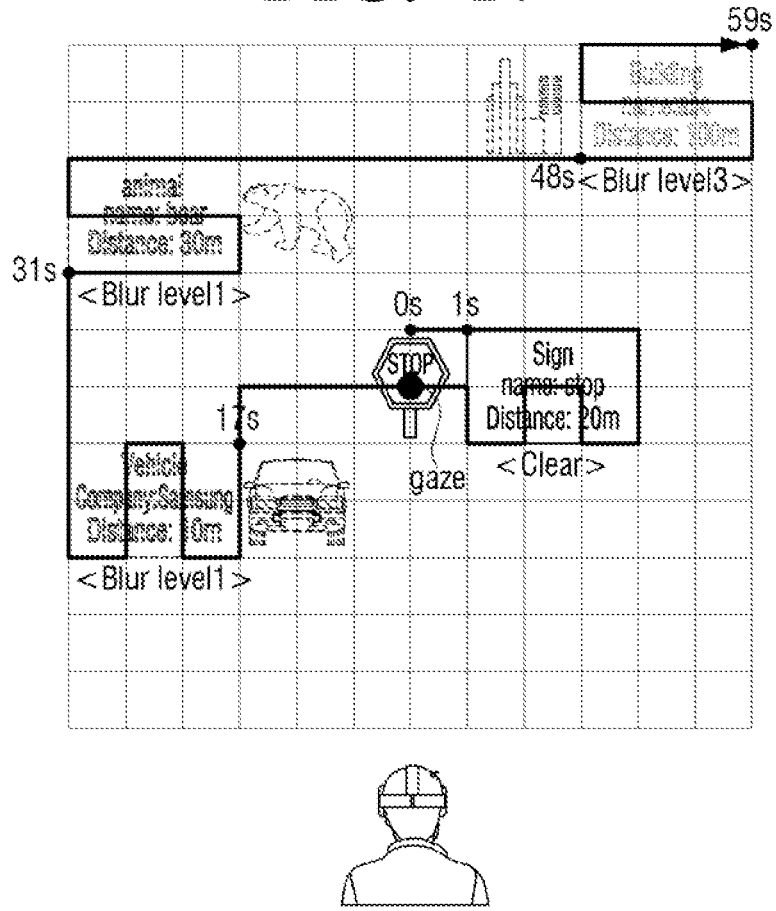
<MOVEMENT PATH OF SCANNING MIRROR FOR MINIMIZING AMOUNT OF CHANGE OF FOCUS ADJUSTING ELEMENT, WHEN FOCUS ADJUSTING ELEMENT IS PROVIDED>
(a)
AMOUNT OF CHANGE OF FOCUS ADJUSTING ELEMENT
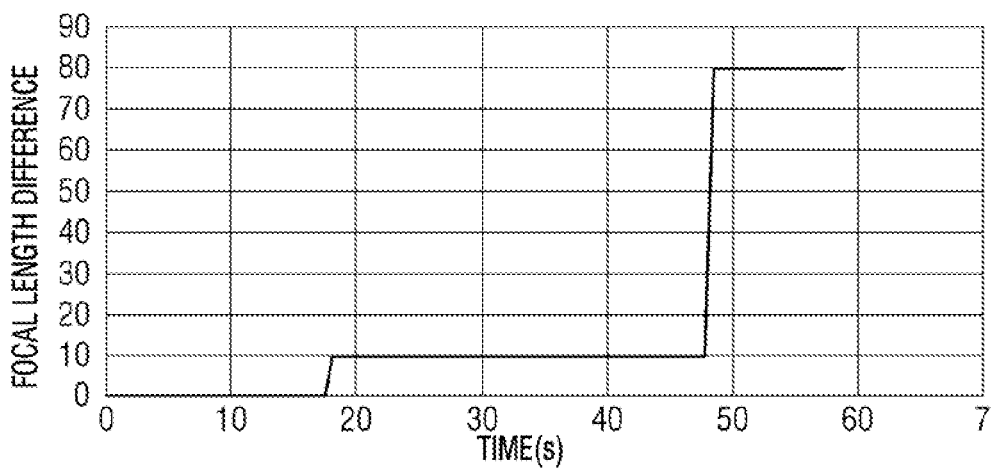
ABLE TO IMPLEMENT WITH NORMAL FOCUS ADJUSTING ELEMENT
(b)

FIG. 18
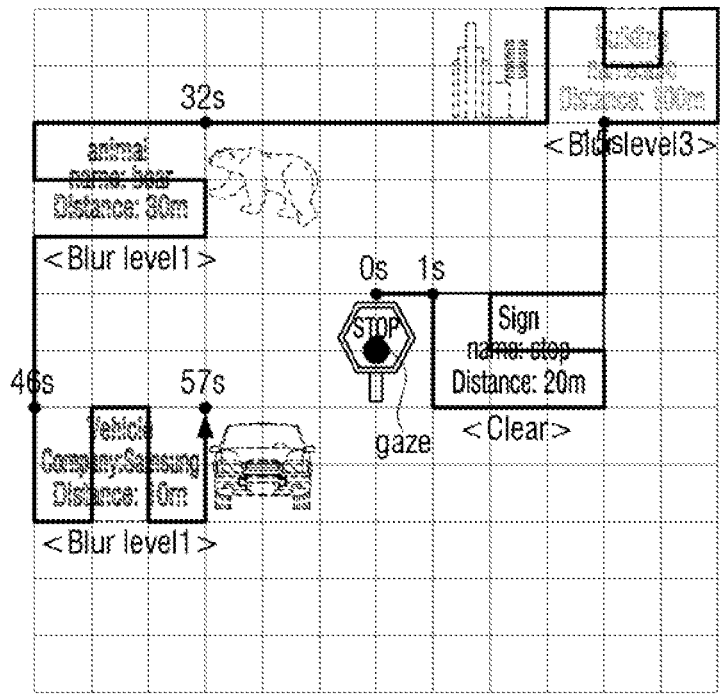
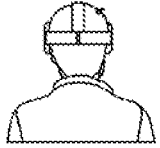
<MOVEMENT PATH OF SCANNING MIRROR FOR MINIMIZING MOVEMENT PATH OF SCANNING MIRROR, WHEN FOCUS ADJUSTING ELEMENT IS PROVIDED>
(a)
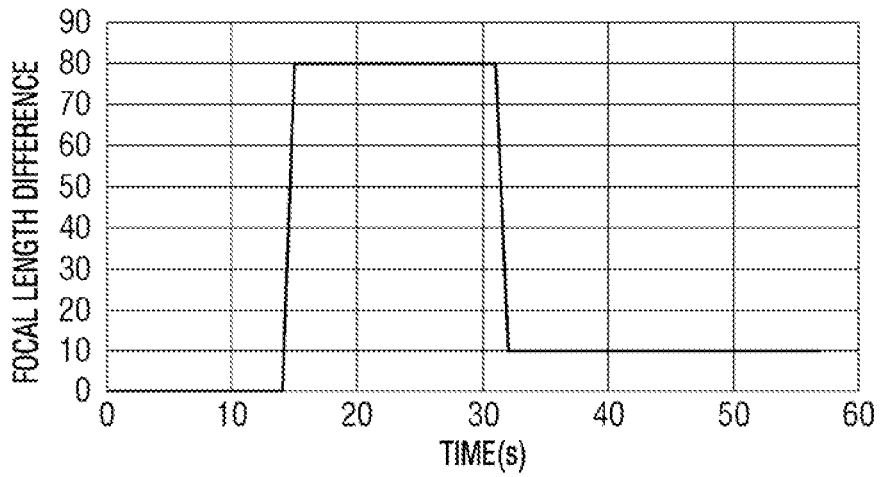
ABLE TO IMPLEMENT WITH NORMAL FOCUS ADJUSTING ELEMENT
(b)

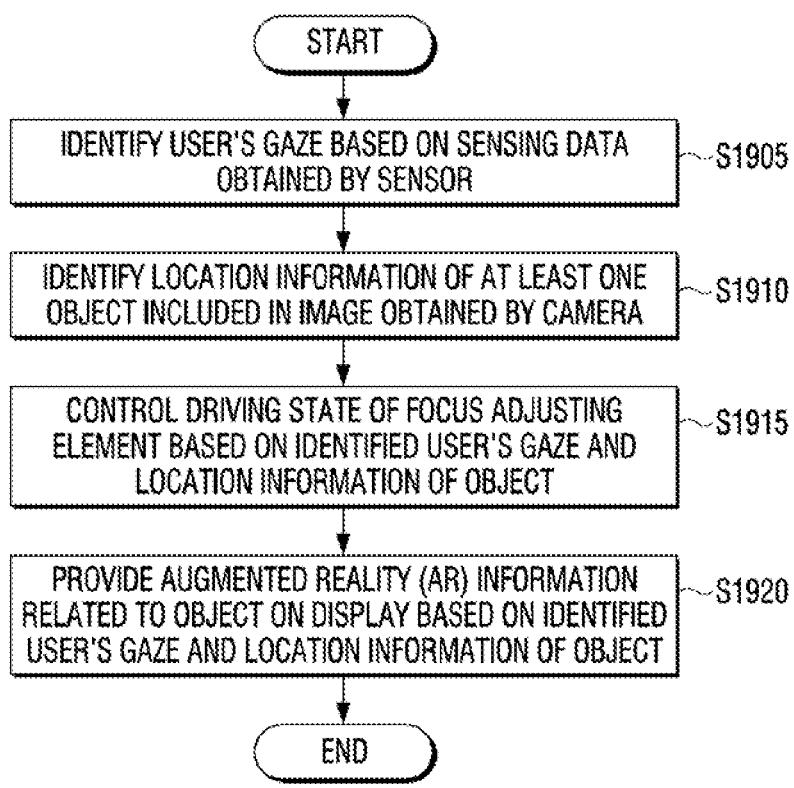

WEARABLE DEVICE AND CONTROL METHOD THEREFOR

TECHNICAL FIELD

The disclosure relates to a wearable device and a control method thereof, and particularly, a wearable device which displays AR (Augmented Reality) information of an object on a display of the wearable device and a control method thereof.

BACKGROUND ART

In order to implement augmented reality glasses, a waveguide and a display may be used. The waveguide may be divided into a reflective type and a diffractive type, and a liquid crystal display (LCD), a liquid crystal on silicon (LCoS), a digital light processing (DLP), and a laser scanning projector (LSP) type may be used for the display.

In a method for outputting a virtual image, vergence-accommodation conflict may occur in any type of the display. Accordingly, sense of reality may deteriorate and this may cause eyestrain or motion sickness such as dizziness.

Meanwhile, since the LSP type uses linear light, a depth (sense of distance or depth) may not be expressed in a virtual image, which caused a problem that all distances of the virtual image are expressed with the same depth.

DISCLOSURE

Technical Problem

The disclosure is made to solve the above-mentioned problems and an object of the disclosure is to provide a wearable device which displays AR information corresponding to an object by adding a focus adjusting element to a laser projector and a control method thereof.

Technical Solution

In accordance with an aspect of the disclosure, there is provided a wearable device including a camera, a sensor, a display, a laser projector, and a processor configured to identify a user's gaze based on sensing data obtained by the sensor, identify location information of at least one object included in an image obtained by the camera, and control the laser projector to provide augmented reality (AR) information related to the object on the display based on the identified user's gaze and location information of the object, in which the laser projector includes a light emitting element configured to emit laser light, a focus adjusting element configured to adjust a focal point of the emitted laser light, and a scanning mirror configured to control a scanning direction of the light with the adjusted focal point, and the processor is configured to control a driving state of the focal adjusting element based on the identified user's gaze and location information of the object.

The processor may be configured to identify whether a location of the object corresponds to the user's gaze by comparing the user's gaze with the location information of the object, and control the driving state of the focus adjusting element based on the identified result.

The processor may be configured to, based on the location of the object corresponding to the user's gaze, provide AR information related to the object on the display by controlling a focal length of the focus adjusting element to be a first focal length, and based on the location of the object not corresponding to the user's gaze, provide the AR information related to the object on the display by controlling the focal length of the focus adjusting element to be a second focal length.

The first focal length may be a unique focal length of the focus adjusting element, and the second focal length may be different from the unique focal length.

The processor may be configured to identify location information of each of a plurality of objects included in the obtained image, based on first AR information related to a first object corresponding to the user's gaze among the plurality of objects being provided, control a focal length of the focus adjusting element to be a first focal length, and based on second AR information related to a second object not corresponding to the user's gaze among the plurality of objects being provided, control the focal length of the focus adjusting element to be a second focal length.

The processor may be configured to, based on the second AR information being provided, control the focal length of the focus adjusting element to be the second focal length based on depth information of the second object.

The processor may be configured to obtain a difference between a depth value included in the depth information of the second object and a depth value corresponding to the identified user's gaze, and control the focal length of the focus adjusting element to be the second focal length based on the obtained difference of depth values.

The processor may be configured to, based on a plurality of objects being included in the obtained image, control the scanning mirror by determining at least one of a scanning start location, a scanning direction, and a scanning path based on location information of each of the plurality of objects.

The processor may be configured to determine at least one of the scanning start location, the scanning direction, and the scanning path so that the focal length of the focus adjusting element is changed in phases based on the location information of each of the plurality of objects.

The processor may be configured to determine at least one of the scanning start location, the scanning direction, and the scanning path to minimize a rotation operation of the scanning mirror based on the location information of each of the plurality of objects.

In accordance with another aspect of the disclosure, there is provided a method for controlling a wearable device including a laser projector including a light emitting element configured to emit laser light, a focus adjusting element configured to adjust a focal point of the emitted laser light, and a scanning mirror configured to control a scanning direction of the light with the adjusted focal point, the method including identifying a user's gaze based on sensing data obtained by a sensor, identifying location information of at least one object included in an image obtained by a camera, controlling a driving state of the focal adjusting element based on the identified user's gaze and location information of the object, and providing augmented reality (AR) information related to the object on a display based on the identified user's gaze and location information of the object.

The controlling the driving state of the focus adjusting element may include identifying whether a location of the object corresponds to the user's gaze by comparing the user's gaze with the location information of the object, and controlling the driving state of the focus adjusting element based on the identified result.

The providing the AR information on the display may include, based on the location of the object corresponding to the user's gaze, providing AR information related to the object on the display by controlling a focal length of the focus adjusting element to be a first focal length, and based on the location of the object not corresponding to the user's gaze, providing the AR information related to the object on the display by controlling the focal length of the focus adjusting element to be a second focal length.

The first focal length may be a unique focal length of the focus adjusting element, and the second focal length may be different from the unique focal length.

The method for controlling the wearable device may further include identifying location information of each of a plurality of objects included in the obtained image, and the controlling the driving state of the focus adjusting element may include, based on first AR information related to a first object corresponding to the user's gaze among the plurality of objects being provided, controlling a focal length of the focus adjusting element to be a first focal length, and based on second AR information related to a second object not corresponding to the user's gaze among the plurality of objects being provided, controlling the focal length of the focus adjusting element to be a second focal length.

The controlling the driving state of the focus adjusting element may include, based on the second AR information being provided, controlling the focal length of the focus adjusting element to be the second focal length based on depth information of the second object.

The controlling the driving state of the focus adjusting element may include obtaining a difference between a depth value included in the depth information of the second object and a depth value corresponding to the identified user's gaze, and controlling the focal length of the focus adjusting element to be the second focal length based on the obtained difference of depth values.

The controlling the driving state of the focus adjusting element may include, based on a plurality of objects being included in the obtained image, controlling the scanning mirror by determining at least one of a scanning start location, a scanning direction, and a scanning path based on location information of each of the plurality of objects.

The controlling the scanning mirror may include determining at least one of the scanning start location, the scanning direction, and the scanning path so that the focal length of the focus adjusting element is changed in phases based on the location information of each of the plurality of objects.

The controlling the scanning mirror may include determining at least one of the scanning start location, the scanning direction, and the scanning path to minimize a rotation operation of the scanning mirror based on the location information of each of the plurality of objects.

DESCRIPTION OF DRAWINGS

FIG. 3 is a diagram illustrating an embodiment of displaying the AR information, when a focus adjusting element is not provided;

FIG. 4 is a diagram illustrating an embodiment of pre-processing the AR information, when the focus adjusting element is not provided;

FIGS. 11 to 14 are diagrams illustrating an AR information displaying method according to each embodiment;

FIGS. 15 to 18 are diagrams illustrating an amount of change of the focus adjusting element according to each embodiment; and FIG. 19 is a flowchart illustrating a method for controlling a wearable device according to an embodiment.

DETAILED DESCRIPTION OF EXEMPLARY EMBODIMENTS

Figure 1A:
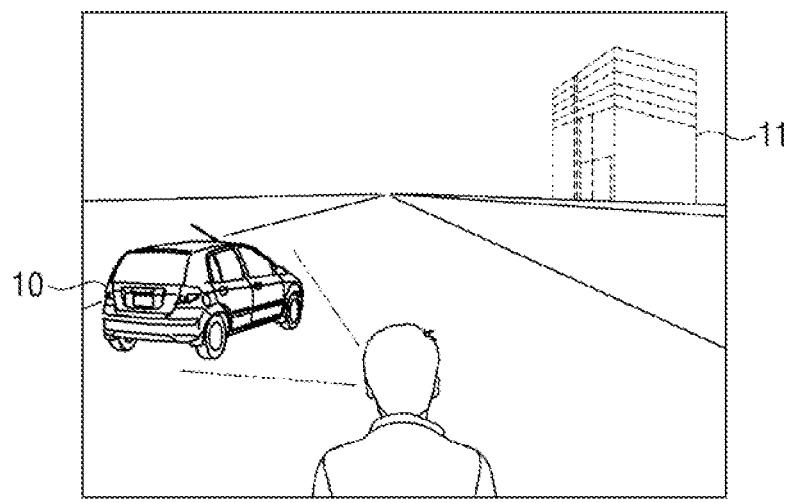
FIGS. 1A and 1B are diagrams illustrating sharpness of an object according to a user's gaze.

The disclosure will be described in detail after briefly explaining the way of describing the specification and the drawings.

The terms used in the specification and claims have been selected as general terms as possible in consideration of functions in the embodiments of the disclosure. But, these terms may vary in accordance with the intention of those skilled in the art, the precedent, technical interpretation, the emergence of new technologies and the like. In addition, there are also terms arbitrarily selected by the applicant. Such terms may be interpreted as meanings defined in this specification and may be interpreted based on general content of the specification and common technical knowledge of the technical field, if there are no specific term definitions.

The same reference numerals or symbols in the accompanying drawings in this specification denote parts or components executing substantially the same function. For convenience of description and understanding, the description will be made using the same reference numerals or symbols in different embodiments. That is, although the components with the same reference numerals are illustrated in the plurality of drawings, the plurality of drawings are not illustrating one embodiment.

In addition, terms including ordinals such as "first" or "second" may be used for distinguishing components in the specification and claims. Such ordinals are used for distinguishing the same or similar components and the terms should not be limitedly interpreted due to the use of ordinals. The terms are used only to distinguish one element from another. For example, in regard to components with such ordinals, usage order or arrangement order should not be limitedly interpreted with the numbers thereof. The ordinals may be interchanged, if necessary.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

A term such as "module", a "unit", or a "part" in the disclosure is for designating a component executing at least one function or operation, and such a component may be implemented as hardware, software, or a combination of hardware and software. Further, except for when each of a plurality of "modules", "units", "parts" and the like needs to be realized in an individual specific hardware, the components may be integrated in at least one module or chip and be implemented in at least one processor.

In addition, in the embodiments of the disclosure, connection of a certain part to another part may include indirect connection via still another medium, in addition to direct connection. When it is described that a certain part includes another certain part, it implies that a still another part may be further included, rather than excluding it, unless otherwise noted.

Figure 1B:
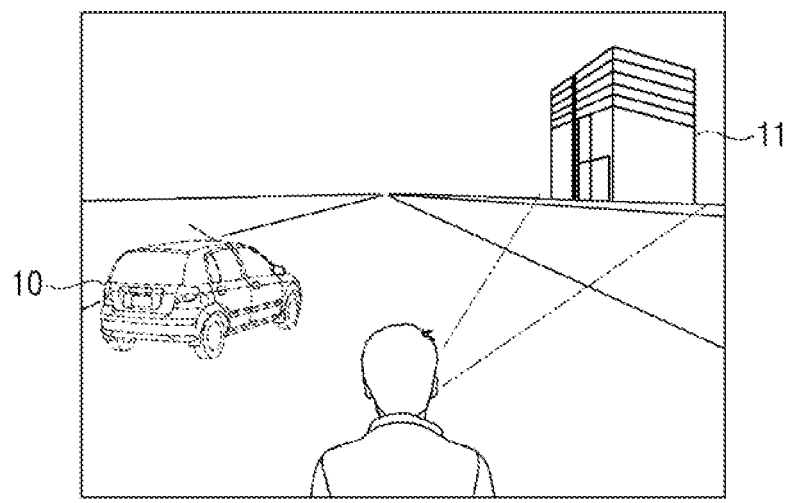

FIGS. 1A and 1B are diagrams illustrating sharpness of an object according to a user's gaze.

FIG. 1A is a diagram illustrating a case where a user fixes user's eye on a vehicle 10 on a left side with respect to the front. When the user fixes user's eye on the vehicle 10 which is an object located on the left side, the user may blurredly recognize objects other than the portion fixed with the user's eye. For example, a building 11 which is a portion other than the left portion fixed with user's eye may be blurredly recognized by the user. For convenience of description, in this specification, an object sharply recognized by the user may be displayed with a solid line and an object blurredly recognized may be displayed with a dotted line. For example, the vehicle 10 fixed with user's eye is displayed with a solid line, and the building 11 located on a portion which is not fixed with user's eye is displayed with a dotted line.

FIG. 1B is a diagram illustrating a case where the user fixes user's eye on the building 11 on a right side with respect to the front. When the user fixes user's eye on the building 11 which is an object located on the right side, the user may blurredly recognize an object other than the portion fixed with user's eye. For example, the vehicle 10 may be blurredly recognized by the user.

Figure 2A:
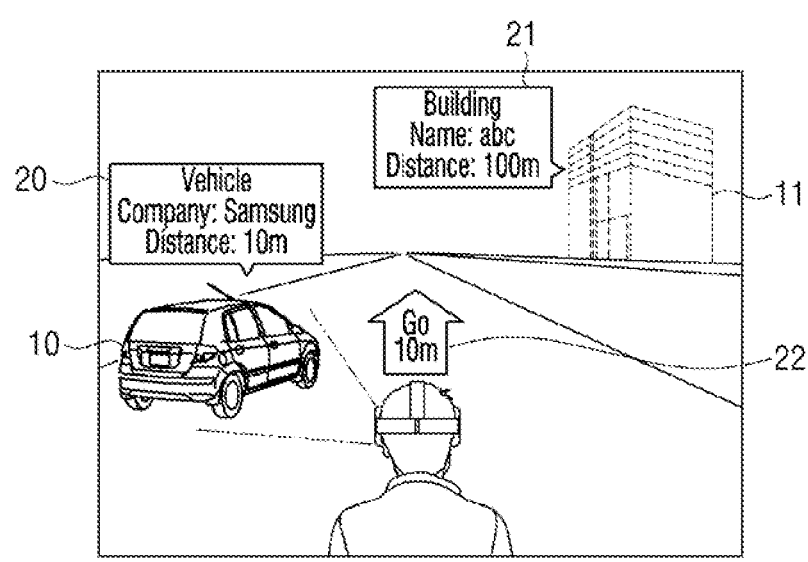
FIGS. 2A and 2B are diagrams illustrating AR information according to a gaze of a user wearing a wearable device.
Figure 2B:
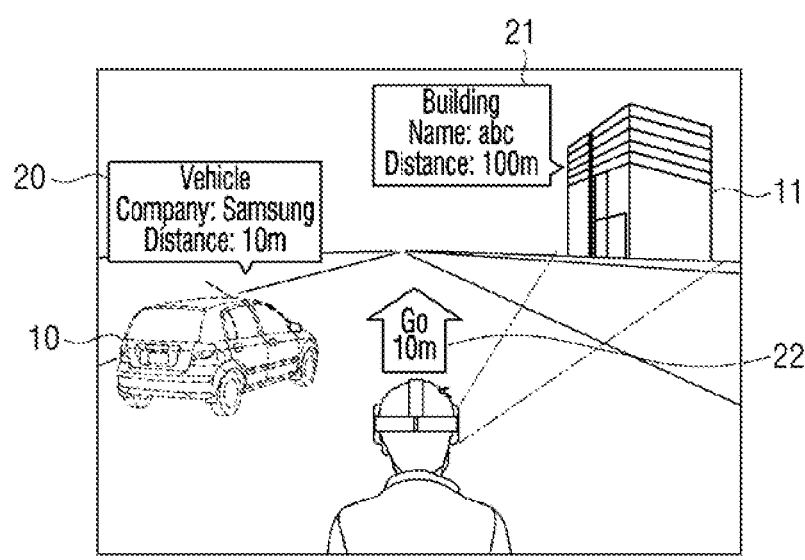

FIGS. 2A and 2B are diagrams illustrating AR information according to a gaze of a user wearing a wearable device.

The wearable device may recognize an object in a range recognizable by a user and display AR information related to the object on a display included in the wearable device. For example, the wearable device may display AR information 20 of the vehicle 10 and the AR information 20 of the vehicle 10 may include a name, a manufacturing company, a distance from the wearable device of the recognized object.

FIG. 2A illustrates an embodiment in which the user fixes user's eye on the vehicle 10 on the left after wearing the wearable device. The user may recognize objects of the vehicle 10 and the building 11 in front. The wearable device may display AR information regarding the recognized objects of the vehicle 10 and the building 11. Referring to FIG. 2A, the wearable device may display AR information including at least one of a type (vehicle), a manufacturing company (Samsung), and a distance from the wearable device (10 m) with respect to the vehicle 10 object. In addition, the wearable device may display AR information including at least one of a type (building), a building name (abc), and a distance from the wearable device (100 m) with respect to the building 11 object. The AR information provided herein may be information of a type set by the user through a menu and the like, information provided from a currently operated application, information according to a type of an object, and the like but is not limited thereto.

Meanwhile, the wearable device may display various pieces of information other than the AR information of the object. For example, the wearable device may display information related to a navigation function. Referring to FIGS. 2A and 2B, the wearable device may display AR information (go 10 m) related to the navigation function in the front portion of the user and the information related to the navigation function may refer to direction and distance indexes for reaching a destination. FIGS. 2A and 2B illustrate only "Go 10 m", but the information related to the navigation function may include information displaying various directions and distances such as "left 15 m", "right 20 m", "turn back 30 m", and the like.

FIG. 2A illustrates an embodiment in which the wearable device displays the AR information, when the user fixes user's eye on the vehicle 10 on the left side after wearing the wearable device.

FIG. 2B illustrates an embodiment in which the wearable device displays the AR information, when the user fixes user's eye on the building 11 on the right side after wearing the wearable device.

The user may sharply recognize the object fixed with user's eye. However, the user may blurredly recognize the object not fixed with user's eye. The wearable device may display the AR information without considering on which object the user's gaze is fixed. Accordingly, in the embodiments corresponding to FIGS. 2A and 2B, the wearable device may sharply display the AR information corresponding to the vehicle 10 and the building 11. In other words, the wearable device may display the AR information with the same sharpness, regardless of the position of the user's gaze.

FIG. 3 is a diagram illustrating an embodiment of displaying the AR information, when a focus adjusting element is not provided.

The wearable device may include a laser scanning projector (LSP) or laser projector 150, as will be described later with reference to FIG. 5. The laser projector 150 may include a light emitting element 151, a focus adjusting element 152, and a scanning mirror 153. The light emitting element 151 herein may be an element emitting red, green, and blue laser light and may be referred to as an RGB laser.

Referring to FIG. 3, the wearable device may display the AR information on the display using the laser projector 150 without the focus adjusting element 152.

A reference numeral 310 may denote an image seen through a transparent display. An image 320 may be an AR information image displayed on the transparent display by the wearable device. The image 320 may include AR information 20 and 21 corresponding to each object or additional information 22. The laser projector 150 may use the light emitting element 151 to display the image 320 on the display. The wearable device may display the image 320 on the transparent display using the laser projector 150, and an image finally displayed by the wearable device for the user may be an image 330. The image 330 may be an image obtained by combining the image seen through the transparent display with the image displayed with the AR information.

Meanwhile, distances, from the wearable device, of the objects of the vehicle 10 and the building 11 recognized by the user may be different from each other. However, wearable device may display the AR information with the same sharpness regardless of the position of the user's gaze, and accordingly, the user may be confused with the sense of distance or depth. For example, the objects recognized by the user may be located at different distances from the wearable device. However, if the wearable device displays the AR information corresponding to each object with the same sharpness regardless of the position of the user's gaze, the user may be confused with the sense of distance or depth regarding each object and the AR information corresponding to each object.

In order to solve such a problem, the wearable device may perform a preprocessing operation with respect to an image regarding the AR information corresponding to each object.

FIG. 4 is a diagram illustrating an embodiment in which a wearable device 100 preprocesses the AR information, when the laser projector 150 does not include the focus adjusting element.

Referring to FIG. 4, the wearable device may identify the position of the user's gaze and perform the preprocessing operation with respect to some AR information of the AR information image, by considering the position of the user's gaze.

For example, the wearable device may distinguish an object at a position of the user's gaze from an object which is not. The wearable device may sharply display the AR information corresponding to the object at the position of the user's gaze and may blurredly display the AR information corresponding to the object not at the position of the user's gaze.

In other words, the wearable device may perform the preprocessing operation with respect to the AR information in advance, and the wearable device may obtain, in advance, an image 420 in which the sharpness (sharp or blurred state) of the AR information corresponding to each object is determined, by considering the position of the user's gaze. The preprocessing operation may refer to an operation of suitably changing the sharpness of the AR information in advance, and the wearable device may output an image, in which the sharpness of some AR information is changed, via the laser projector 150. Herein, the laser projector 150 may not include the focus adjusting element.

A reference numeral 410 may denote an image seen through the transparent display. A reference numeral 420 may denote an AR information image displayed on the transparent display by the wearable device. The image 420 may include the AR information 20 and 21 corresponding to each object and the additional information 22. The laser projector 150 may use the light emitting element 151 to display the image 420 on the display. The wearable device may display the image 420 on the transparent display using the laser projector 150, and an image finally displayed by the wearable device for the user may be an image 430. The image 430 may be an image obtained by combining the image seen through the transparent display with the image displayed with the AR information.

Figure 5:
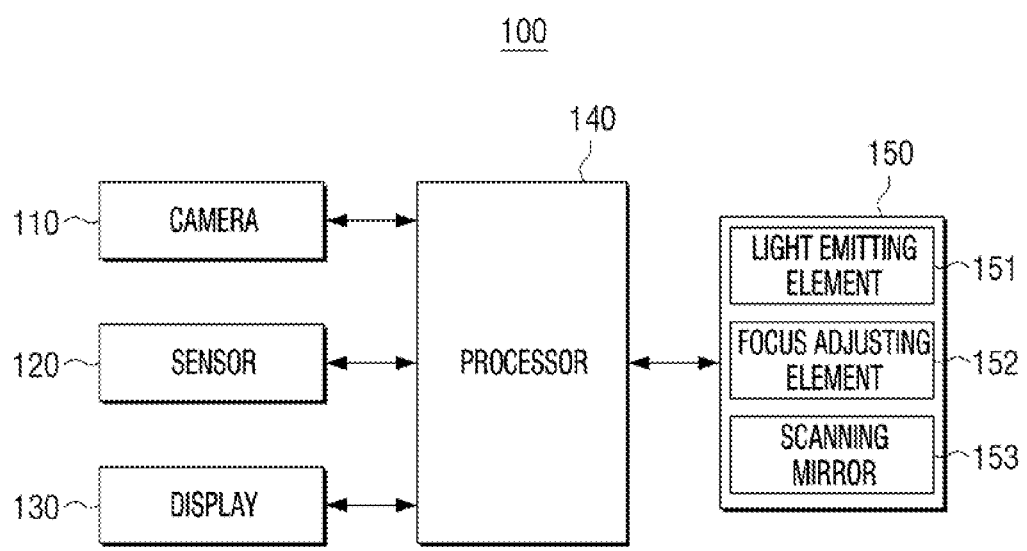
FIG. 5 is a block diagram illustrating the wearable device according to an embodiment of the disclosure.

FIG. 5 is a block diagram illustrating the wearable device according to an embodiment of the disclosure.

Referring to FIG. 5, the wearable device 100 may include a camera 110, a sensor 120, a display 130, a processor 140, the laser scanning projector (LSP) or laser projector 150.

The camera 110 may be used as a device for recognizing objects in front of the user by the wearable device 100 and the camera 110 may capture an image to identify things and environment in front. The wearable device 100 may detect characteristics of objects located in front of the user using the camera 110. In addition, the wearable device 100 may detect how the objects identified by the camera 110 are distributed in the space (depth map) and what each object is (object recognition). In addition, the wearable device 100 may determine which information is to be displayed on the corresponding location by using measured information.

The sensor 120 may be used as a device for identifying the user's gaze. For example, the sensor 120 may detect a movement of user's pupils, in order to identify where the user is looking at. Herein, the sensor 120 and the camera 110 are separately displayed, but the wearable device 100 may include a camera other than the camera 110 for identifying the object in front and the other camera may be attached to the sensor 120.

For the display 130, a transparent display may be used so that the user is able to look ahead. The user may look ahead through the display 130, and AR information corresponding to a specific object may be displayed on a part of the display 130.

The processor 140 may perform general control operations of the wearable device. Specifically, the processor may identify an object using image information captured by the camera 110 and obtain AR information corresponding to the object. In addition, the processor may control the laser projector 150 to display the AR information on the display 140.

The processor may be implemented as a digital signal processor (DSP) or a microprocessor processing digital signals. However, there is no limitation thereto, and the processor may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 140 may be implemented as System on Chip (SoC) or large scale integration (LSI) including the processing algorithm or may be implemented in form of a field programmable gate array (FPGA).

The processor 140 may identify the user's gaze based on sensing data obtained by the sensor 120 and the processor 140 may identify information regarding at least one object included in the image obtained by the camera 110. The information regarding the object may include information of an object such as a type, a name, a shape, a color, and the like of the object and may include location information regarding a location where the object exists.

The processor 140 may obtain augmented reality (AR) information related to the object based on the identified user's gaze and information of the object. In order to obtain the information of the object, the user may analyze the image captured by the camera 110. An object may be identified in the image captured by the camera and AR information corresponding to the corresponding object may be obtained. As a method for obtaining the AR information, the processor 140 may use an internal storage device. The information of the object may be obtained by using a database stored in the internal storage device in advance.

Meanwhile, in actual implementation, the processor 140 may use an external server to obtain the AR information corresponding to the object. The processor 140 may transmit the information of the object to the external server and receive the corresponding AR information from the external server. Herein, the processor 140 may further additionally include a communicator (not illustrated) for transmitting and receiving data.

Meanwhile, the processor 140 may control the laser projector 150 to provide the obtained AR information on the display 130.

The laser projector 150 may include the light emitting element 151 which emits laser light, the focus adjusting element 152 which adjusts a focus of the emitted laser light, and the scanning mirror 153 which controls a scanning direction of the light with the adjusted focus.

Referring to FIG. 5, the laser projector 150 may be a laser scanning projector (LSP) and may include the light emitting element 151, the focus adjusting element 152, and the scanning mirror 153.

The laser projector 150 may be a device for outputting a laser light source and may use the LSP method.

The light emitting element 151 may output mainly light sources with three colors of red, green, and blue and may output light with various colors by additionally combining a white light source with the three light sources.

The focus adjusting element 152 may be an element through which the light output from the light emitting element 151 is transmitted and may refract light. When the focus adjusting element 152 is controlled, a degree of refraction of transmitted light may change. When the degree of refraction of light changes, a focus of a virtual image may change, and accordingly, the user may sharply or blurredly recognize an object.

The focus adjusting element 152 may be formed of a liquid lens, a liquid crystal lens, or the like. The liquid lens may refer to a lens which adjusts a refractive index by changing a thickness or a shape of the lens physically, and the liquid crystal lens may refer to a lens which adjusts a refractive index by changing a chemical configuration or arrangement of molecules.

The processor 140 may control a driving state of the focus adjusting element 152 based on the identified user's gaze and location information of the object.

Herein, the processor 140 may identify whether the location of the object corresponds to the user's gaze by comparing the user's gaze with the location information of the object. The processor 140 may control the driving state of the focus adjusting element 152 based on the identified result.

Specifically, when the location of the object corresponds to the user's gaze, the processor 140 may perform control a focal length of the focus adjusting element 152 to be a first focal length and may provide the AR information related to the object on the display 130. Herein, the focal length may be a distance between a focal point, at which light rays meet after transmitting the focus adjusting element 152, and a reference point. The reference point may refer to a vertex of the focus adjusting element 152. The focal length may vary depending on a refractive index of the focus adjusting element 152. For example, when the refractive index of the focus adjusting element 152 changes, the focal length may also change. The first focal length may correspond to a pre-stored distance in a state where the focus adjusting element 152 has a specific refractive index.

When the processor 140 changes the refractive index by adjusting the focus adjusting element 152, the focal length may be changed. When the focal length is changed, the sharpness of the object may be different. The sharpness being different may imply a change in sharpness of an image formed on the retina of the user. Specifically, while the light output from the laser projector 150 is the same, the sharpness of the image recognized by the user may vary depending on a change in refractive index of the focus adjusting element 152.

Meanwhile, when the location of the object does not correspond to the user's gaze, the processor 140 may perform control the focal length of the focus adjusting element 152 to be a second focal length and may provide the AR information related to the object on the display 130.

Herein, the first focal length may refer to a unique focal length of the focus adjusting element 152 and the second focal length may be different from the unique focal length.

Meanwhile, the processor 140 may identify location information of each of a plurality of objects included in the obtained image. When providing first AR information related to a first object corresponding to the user's gaze among the plurality of objects, the processor 140 may perform control the focal length of the focus adjusting element 152 to be the first focal length.

When providing second AR information related to a second object not corresponding to the user's gaze among the plurality of objects, the processor 140 may perform control the focal length of the focus adjusting element 152 to be the second focal length.

In addition, when providing the second AR information, the processor 140 may perform control the focal length of the focus adjusting element 152 to be the second focal length based on depth information of the second object.

Further, the processor 140 may obtain a difference between a depth value included in the depth information of the second object and a depth value corresponding to the identified user's gaze, and perform control the focal length of the focus adjusting element 152 to be the second focal length based on the obtained difference in depth value. The depth value herein may refer to an index representing the sense of distance of the object. The depth value may have a distance of the object from the wearable device 100 as a reference.

In addition, when the obtained image includes a plurality of objects, the processor 140 may control the scanning mirror 153 by determining at least one of a scanning start location, a scanning direction, and a scanning path based on location information of each of the plurality of objects. The scanning mirror 153 may reflect light (light source) output from the light emitting element 151 to project the light at a specific location. Accordingly, the processor 140 may reflect light (light source) output from the light emitting element 151 to project the light at a specific location by adjusting the start location, the direction, the path, and the like of the scanning mirror 153.

In addition, the processor 140 may determine at least one of the scanning start location, the scanning direction, and the scanning path so that the focal length of the focus adjusting element 152 is changed in phases based on the location information of each of the plurality of objects.

Further, the processor 140 may determine at least one of the scanning start location, the scanning direction, and the scanning path so that a rotation operation of the scanning mirror 153 is minimized based on the location information of each of the plurality of objects. This will be described later in detail with reference to FIGS. 15 to 18.

When using the laser projector 150, even if the focus adjusting element 152 is not provided, the AR information may be blurred in advance and then displayed on the display. In such a case, similar effect may be exhibited. However, a pixel which substantially passes through a crystalline lens to be formed on the retina corresponds to an extremely small laser point, thereby not corresponding to an optically blurred image. Accordingly, the user may feel awkward due to a difference between sharpness of the image actually formed on the retina and sharpness information of an image sent to the brain.

However, since the wearable device 100 according to an embodiment of the disclosure outputs an image via the focus adjusting element 152, a size of light corresponding to one pixel distributed (or focused or formed) to the retina may be optically the same as in a situation where the object looks blurred in reality. Therefore, the user may smoothly recognize the AR information. In addition, the AR information other than the region where the user gazes is expressed blurred, thereby being effective in protection of the retina of the user.

As a result, in a case of the wearable device not including the focus adjusting element 152, the user may feel awkward with respect to the depth (sense of distance or depth) of the virtual image or the AR information. However, when using the wearable device 100 according to an embodiment of the disclosure, it is possible to experience natural augment reality environment by reflecting the depth (sense of distance or depth) of the AR information.

Figure 6:
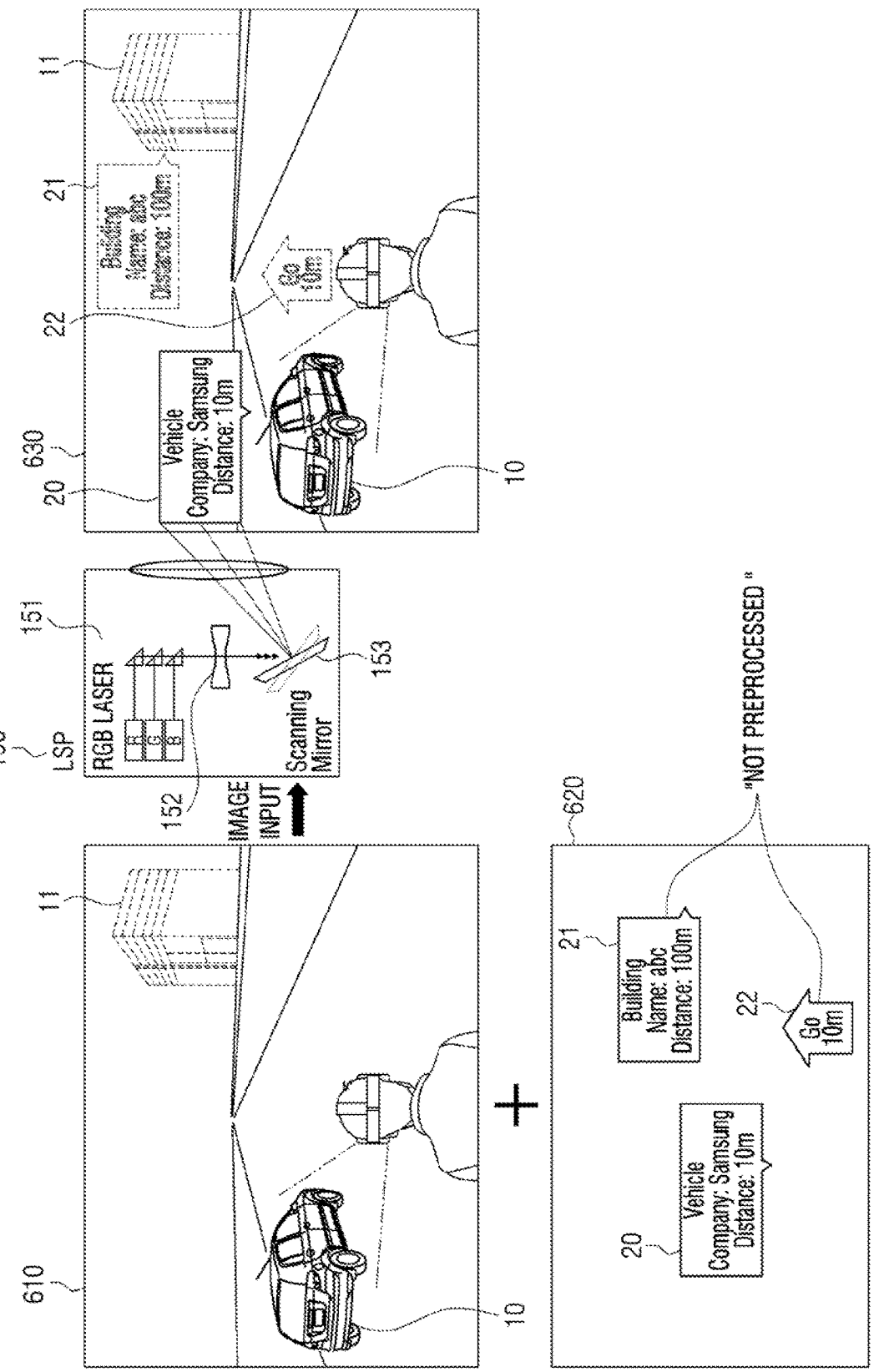
FIG. 6 is a diagram illustrating an embodiment of displaying the AR information, when the focus adjusting element is provided.

FIG. 6 is a diagram illustrating an embodiment of displaying the AR information, when the focus adjusting element is provided.

The embodiment in which the wearable device does not include the focus adjusting element 152 has been described above with reference to FIGS. 1 to 4, but referring to FIG. 6, the laser projector 150 of the wearable device may additionally include the focus adjusting element 152.

A reference numeral 610 may denote an image seen through via a transparent display. A reference numeral 620 may denote an AR information image displayed on the transparent display by the wearable device. The image 620 may include the AR information 20 and 21 corresponding to each object or the additional information 22. The laser projector 150 may use the light emitting element 151 to display the image 620 on the display. The wearable device may display the image 620 on the transparent display using the laser projector 150, and an image finally displayed by the wearable device for the user may be an image 630. The image 630 may be an image obtained by combining the image seen through the transparent display with the image displayed with the AR information.

Herein, the AR information included in the image 620 may be information corresponding to an image not subjected to the preprocessing operation.

When the laser projector 150 emits the image 620 not subjected to the preprocessing operation through the light emitting element 151, the wearable device may perform control the laser light emitted through the light emitting element 151 to transmit through the focus adjusting element 152.

Herein, the wearable device may identify the location of each object and position of the user's gaze. In addition, the wearable device may control the focus adjusting element 152 by considering the location of the object and the position of the user's gaze.

Further, the wearable device may distinguish the object at the position of the user's gaze and the object which is not. The wearable device may control the focus adjusting element 152 to sharply display the AR information corresponding to the object at the position of the user's gaze, and may control the focus adjusting element 152 to blurredly display the AR information corresponding to the object which is not at the position of the user's gaze.

There are various methods for a method for controlling the focus adjusting element 152 by the wearable device. The wearable device may adjust sharpness of the image by changing the refractive index of the focus adjusting element 152. In the focus adjusting element 152 according to an embodiment of the disclosure, when a thickness of the lens changes, the refractive index may change. However, in the focus adjusting element 152 according to an embodiment of the disclosure, although the thickness of the lens is not changed, the refractive index may be changed by a change in material and internal component of the lens, and the sharpness of the image may be adjusted according to the change in refractive index.

As a result, the wearable device may transmit the image 620 not subjected to the preprocessing operation through the focus adjusting element 152 and make the user recognize each of AR information corresponding to each object with focal points different from each other.

The user may see an image displayed with the AR information obtained by considering both the location of the object and the position of the user's gaze through the transparent display. The final image 630 shown through the transparent display may be displayed with suitable AR information corresponding to each object and may be specifically an image obtained by reflecting sense of distance and depth. Accordingly, the user may be less confused with the sense of distance and depth.

Meanwhile, in the description with reference to FIG. 6, it is described that the focus adjusting element 152 is disposed between the light emitting element 151 and the scanning mirror 153, but the focus adjusting element 152 may exist at various positions according to another embodiment.

Figure 7:
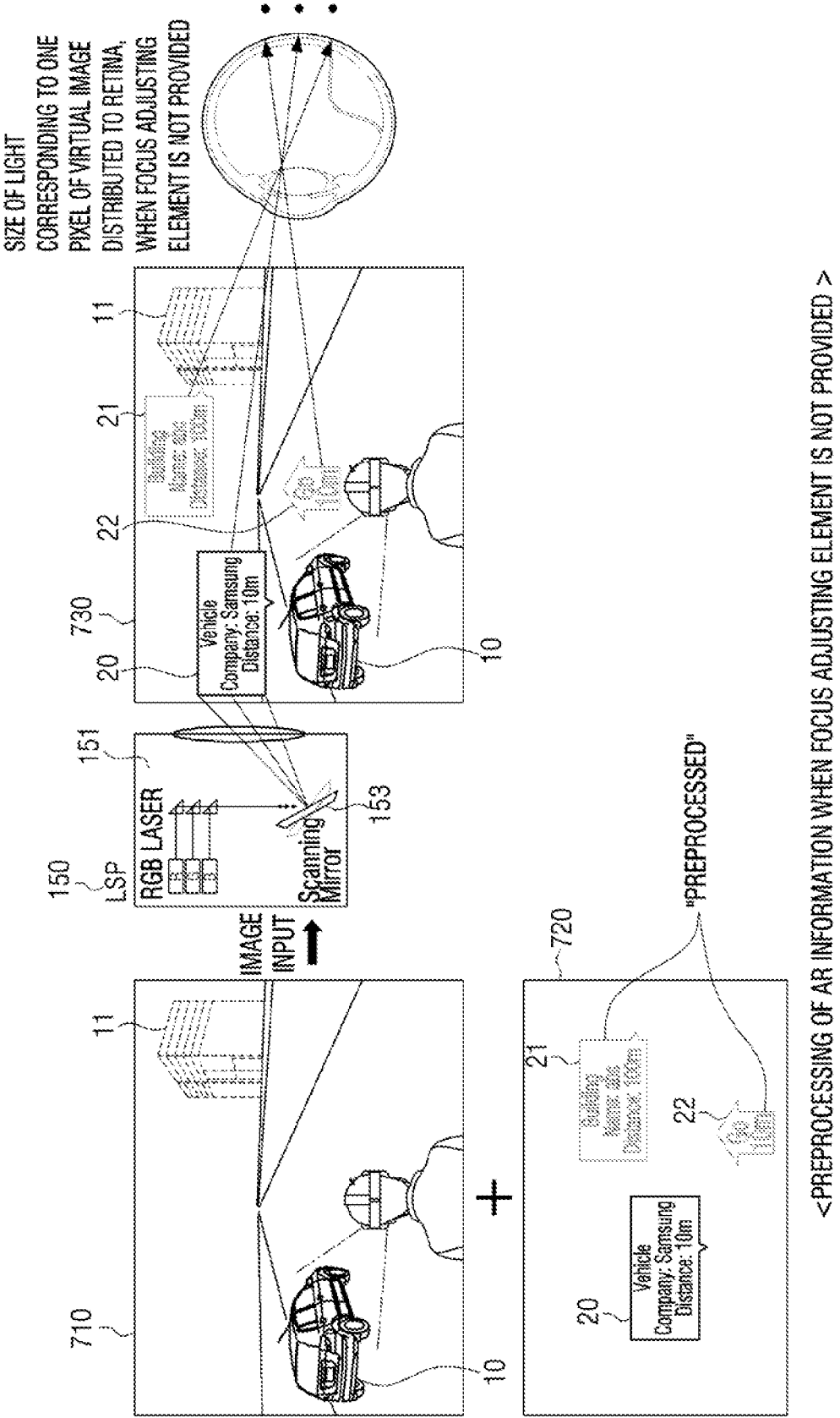
FIGS. 7 and 8 are diagrams illustrating a situation where one pixel of a virtual image is formed on the retina.
Figure 8:
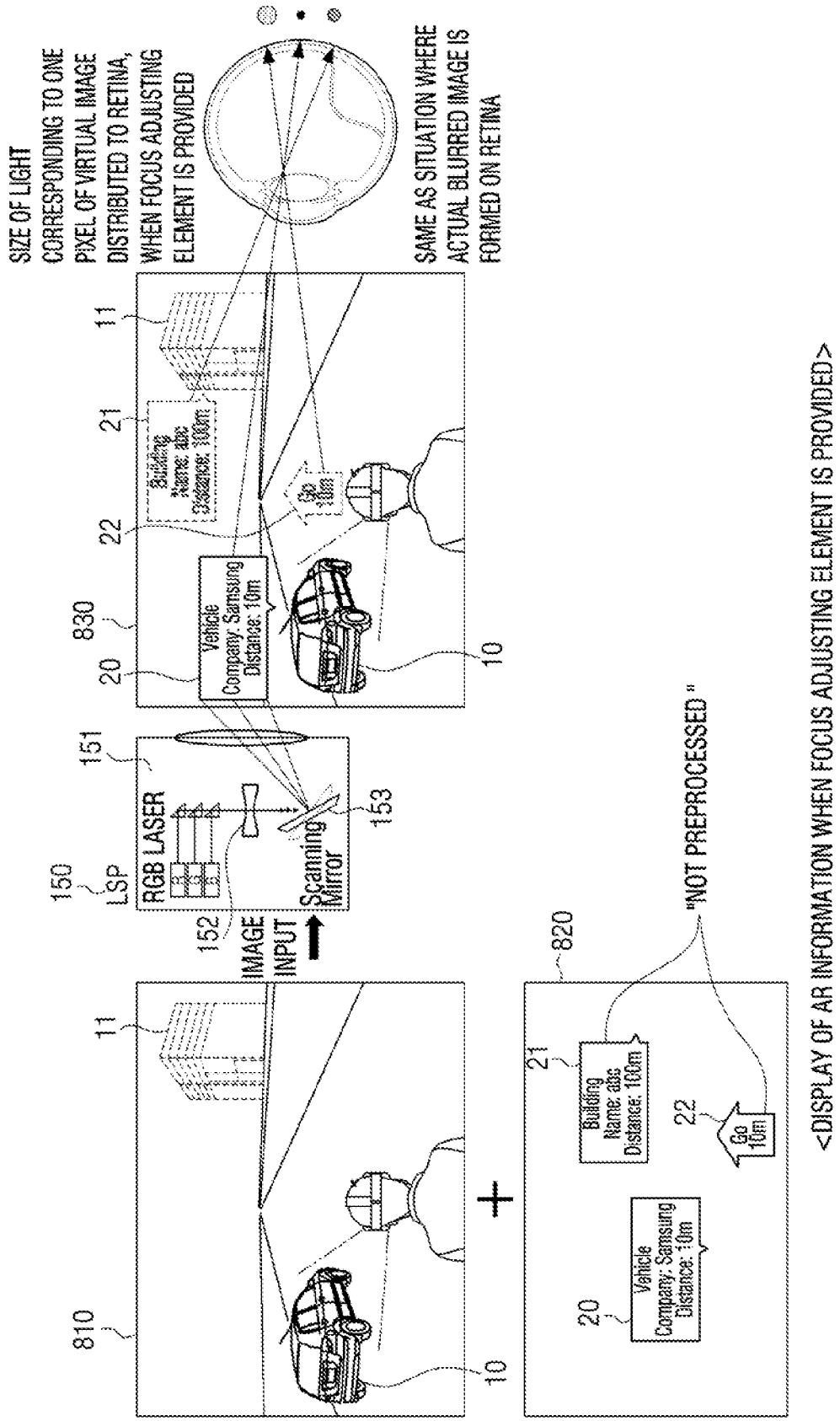

FIGS. 7 and 8 are diagrams illustrating a situation where one pixel of a virtual image is formed on the retina.

FIG. 7 is a diagram illustrating an embodiment in which the wearable device 100 preprocesses the AR information, when the laser projector 150 does not include the focus adjusting element.

A reference numeral 710 may denote an image seen through the transparent display. An image 720 may be an AR information image displayed on the transparent display by the wearable device. The image 720 may include the AR information 20 and 21 corresponding to each object or the additional information 22. The laser projector 150 may use the light emitting element 151 to display the image 720 on the display. The wearable device may display the image 720 on the transparent display using the laser projector 150, and an image finally displayed by the wearable device for the user may be an image 730. The image 730 may be an image obtained by combining the image seen through the transparent display with the image displayed with the AR information.

Herein, the AR information included in the image 720 may be information corresponding to an image subjected to the preprocessing operation. The preprocessing operation has been described above in detail with reference to FIG. 4.

The wearable device 100 may preprocess the AR information and output an image obtained by changing sharpness of some AR information via the laser projector 150. In this case, sizes of light rays corresponding to the image output from the laser projector 150 which are distributed (or focused or formed) to the retina of the user may be the same. Specifically, when the laser projector 150 does not include the focus adjusting element, the size of light corresponding to one pixel of the virtual image 720 including the AR information which is focused (or formed or distributed) on the retina may be the same. This may be a result caused by the properties of the laser. When the user recognizes an image output from the laser, the user may recognize the output image with the same sharpness regardless of distance information.

Meanwhile, even if the AR information is preprocessed according to the distance information of the objects, the user may recognize the AR information awkwardly. The image output via the laser may be unnatural to express the sense of distance and the user may experience eyestrain or dizziness.

In order to solve such a problem, the wearable device 100 may additionally include the focus adjusting element 152 in the laser projector 150.

FIG. 8 is a diagram illustrating an embodiment in which the wearable device 100 displays the AR information, when the focus adjusting element 152 is additionally included.

A reference numeral 810 may denote an image seen through a transparent display. An image 820 may be an AR information image displayed on the transparent display by the wearable device. The image 820 may include the AR information 20 and 21 corresponding to each object or the additional information 22. The laser projector 150 may use the light emitting element 151 to display the image 820 on the display. The wearable device may display the image 820 on the transparent display using the laser projector 150, and an image finally displayed by the wearable device for the user may be an image 830. The image 830 may be an image obtained by combining the image seen through the transparent display with the image displayed with the AR information.

Meanwhile, the portions 21 and 22 corresponding to some AR information in the image 820 may not be subjected to the preprocessing operation, unlike in FIG. 7.

In the wearable device 100, the focus adjusting element 152 may be disposed between the light emitting element 151 and the scanning mirror 153 and an image may be output.

In this case, the sizes of light rays corresponding to the image output by the laser projector 150 which are distributed to the retina of the user may vary according to the focus adjusting element 152. The wearable device 100 may adjust the focus adjusting element 152 after determining whether to display the AR information of the object sharply, and in this case, a size of an image formed on the retina of the user may vary depending on the refractive index of the focus adjusting element.

For example, the AR information of the object corresponding to the position fixed with the user's gaze may be output via the laser projector 150 and a graphic pixel of the AR information as a virtual image may be formed on the retina of the user as a small image. Herein, a pixel of the AR information 22 separated from the user's gaze by approximately 10 m may be formed on the retina of the user as a slightly larger image. In addition, a pixel of the AR information 21 separated from the user's gaze by approximately 90 m may be formed on the retina of the user as a very larger image.

When comparing the sizes, the sizes of the images may be large in the order of the AR information 20, 22, and 21. As the size of the image formed on the retina is larger, the user may recognize the corresponding part blurredly. As a result, the user may recognize the AR information 20 most sharply, recognize the AR information 22 blurredly to a moderate degree, and recognize the AR information 21 most blurredly.

The wearable device 100 may adjust the focus adjusting element 152 based on the location information of the object or the distance information from the wearable device 100, thereby changing the size of the image formed on the retina. Since the user recognizes the sizes of the images differently, the user may recognize the AR information displayed on the transparent display naturally. The user who uses the wearable device 100 according to an embodiment of FIG. 8 may experience less eyestrain and dizziness.

Figure 9:
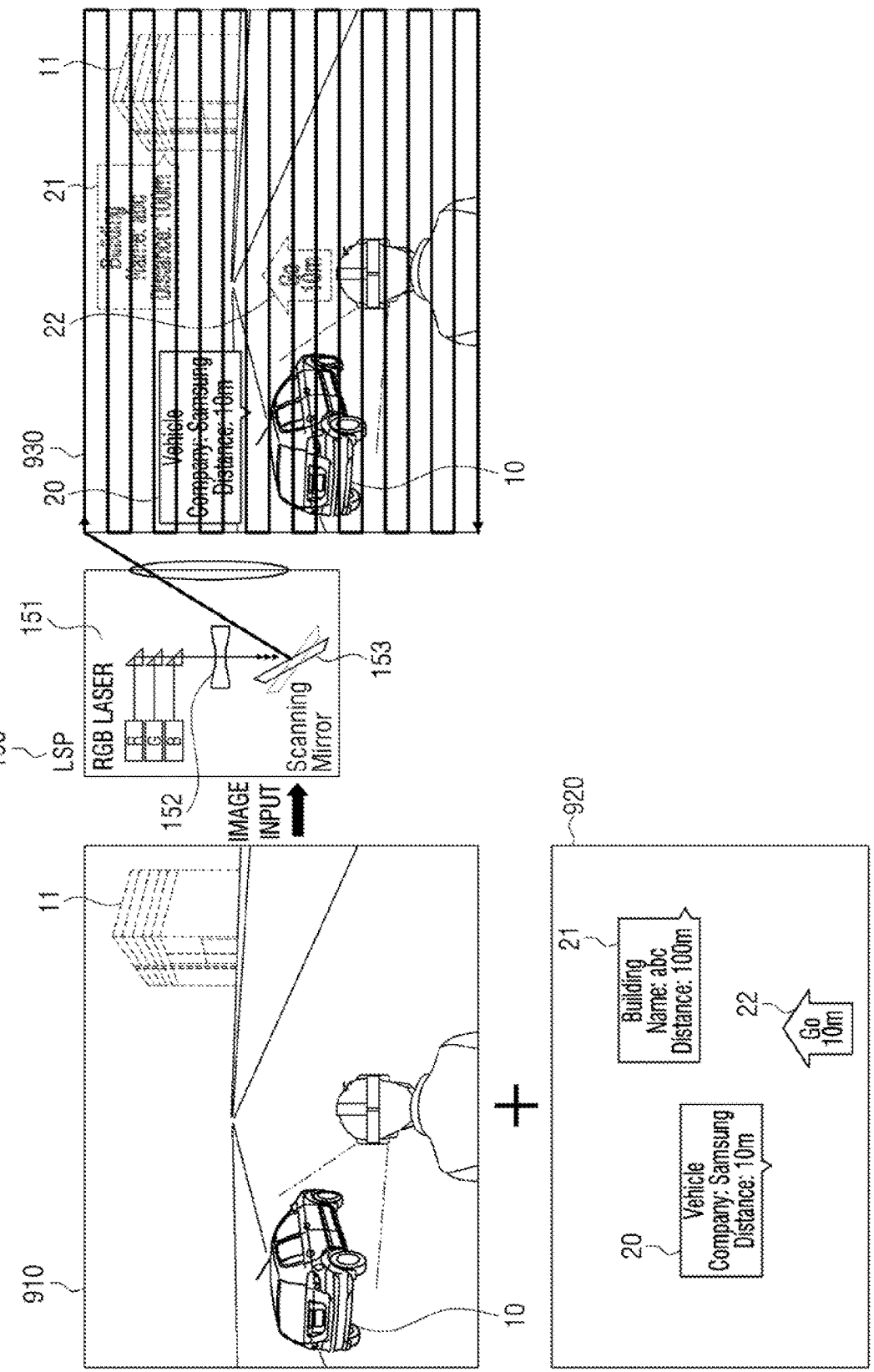
FIGS. 9 and 10 are diagrams illustrating a movement path of a laser reflected on a scanning mirror.
Figure 10:
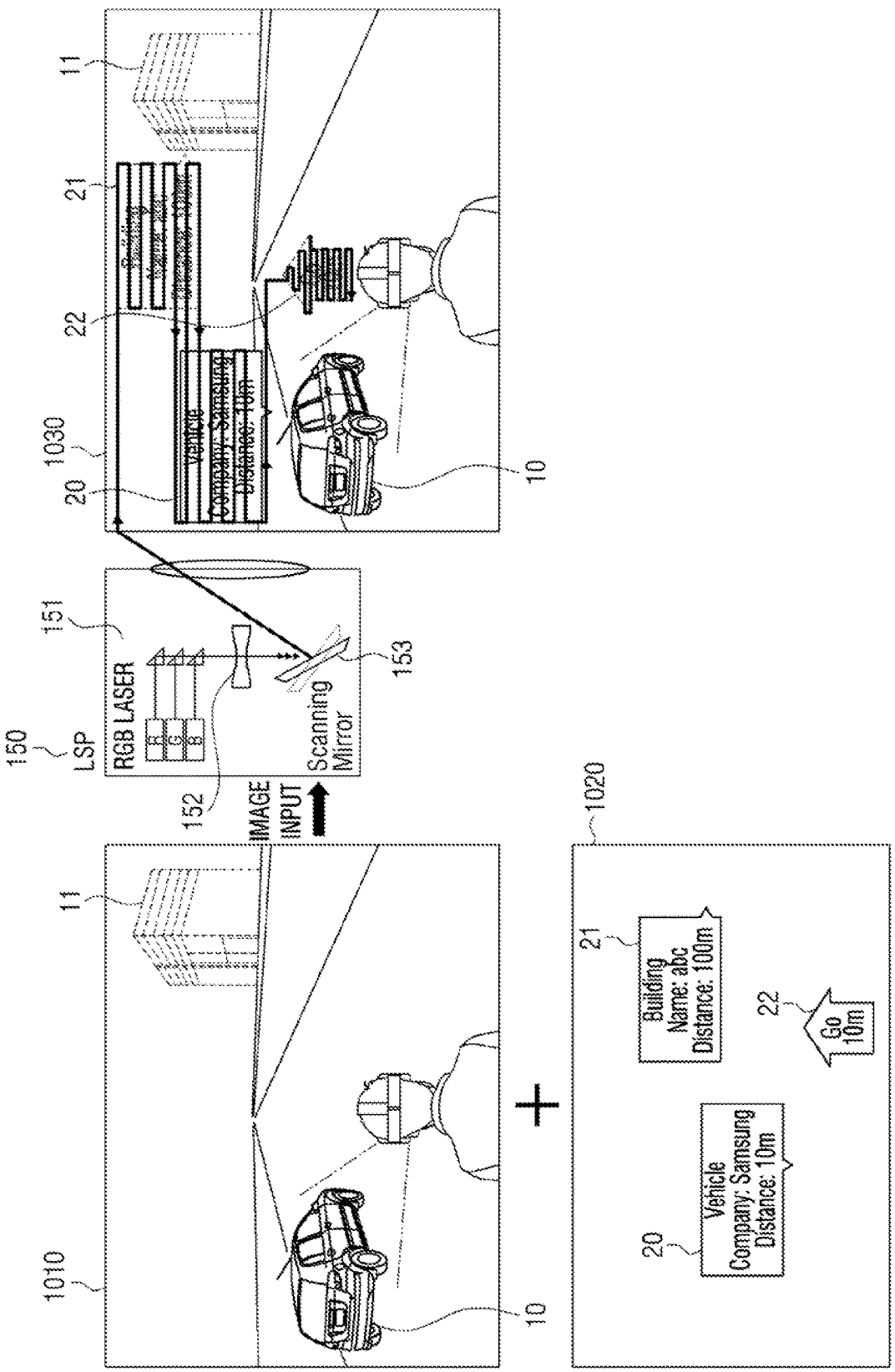

FIGS. 9 and 10 are diagrams illustrating a movement path of a laser reflected on a scanning mirror.

The laser projector 150 may include the scanning mirror 153 and the wearable device 100 may project light output from the light emitting element 151 through the scanning mirror 153 to various positions. The scanning mirror 153 may play a role of reflecting light and the wearable device 100 may project light to a desired position by adjusting an angle of the scanning mirror 153.

The wearable device 100 may control the scanning mirror 153 to project light through a desired movement path.

FIG. 9 is a diagram illustrating an embodiment of one movement path through which the wearable device 100 projects light by controlling the scanning mirror 153. Images 910, 920, and 930 herein may correspond to images 610, 620, and 630 of FIG. 6, respectively.

The wearable device 100 may control the scanning mirror 153 of the laser projector 150 to display the AR information and move the scanning mirror 153 to any position of the display. The image 930 may be an image obtained by combining the image 920 including the AR information with the image 910 seen through the transparent display. The wearable device 100 may output the AR information 20, 21, and 22 using the laser projector 150 to combine the image 920. In this case, the laser projector 150 may control the scanning mirror 153 to project the light to all of positions.

FIG. 9 illustrates that the light is projected to all of positions, but this is merely for illustrating the position where the light is able to be projected by the scanning mirror 153, and the light may actually project only to a region displayed with the AR information 20, 21, and 22 corresponding to the image 920. For example, the light is emitted by the light emitting element 151 in the region displayed with the AR information 20, 21, and 22 corresponding to the image 920, but the light may not be emitted by the light emitting element 151 in a region which is not.

Meanwhile, the wearable device 100 according to another embodiment may emit light corresponding to visible light to a region displayed with the AR information 20, 21, and 22 corresponding to the image 920 and may emit light corresponding to invisible light that is not recognized by human eyes to a region not displayed with the AR information 20, 21, and 22 corresponding to the image 920.

Meanwhile, FIG. 10 is a diagram illustrating another embodiment of the movement path through which the wearable device 100 projects light by controlling the scanning mirror 153. Images 1010, 1020, and 1030 herein may correspond to images 610, 620, and 630 of FIG. 6, respectively.

Referring to FIG. 10, the wearable device 100 may not move the scanning mirror 153 with respect to all possible positions. The wearable device 100 may move the scanning mirror 153 only for a region displayed with the AR information 20, 21, and 22 in the image 1020. The movement path illustrated in FIG. 10 may be a minimum movement path for passing through only the region displayed with the AR information 20, 21, and 22 in the image 1020.

The movement paths of the scanning mirror 153 illustrated in FIGS. 9 and 10 are merely a description for some of various movement paths and various methods not illustrated may be applied in actual implementation.

Meanwhile, in FIGS. 3, 4, 6, 7, 8, 9, and 10, the image seen through the transparent display and the image displayed with the AR information are separately described, but in actual implementation, the image may be implemented by a method for combining a captured image with AR information. Specifically, the wearable device 100 may capture a scene in front of the user, store it as one image, and newly generate an image related to AR information. The wearable device 100 may generate one image by combining the image obtained by capturing the scene in front of the user with the image related to the AR information. The wearable device 100 may display one combined image on the display.

FIGS. 11 to 14 are diagrams illustrating an AR information displaying method according to each embodiment.

Referring to FIG. 11, a plurality of objects 30 to 33 may be located in front of the user and the user may fix a gaze 50 on any one of the plurality of objects. In FIG. 11, it is assumed that objects of a sign 30, a bear 31, a vehicle 32, and a building 33 are located in front of the user. It is assumed that the user's gaze is fixed on the sign 30. The assumption of FIG. 11 may be the same as in FIGS. 12 to 18.

FIG. 12 is a diagram illustrating an embodiment in which the wearable device 100 displays the AR information, when the laser projector 150 does not include the focus adjusting element 152.

Each AR information corresponding to each object may include a type (classification), a name, and distance information from the wearable device 100.

AR information 40 corresponding to the sign 30 object may include Sign, stop, and 20 m. In other words, regarding the AR information 40, the type may be stored as sign, the name may be stored as stop, and the distance information from the wearable device 100 to the object may be stored as 20 m. When the wearable device 100 recognizes the sign 30 object, the wearable device 100 may obtain the AR information 40 corresponding to the sign 30 object, and in this case, the AR information 40 may be Sign, stop, and 20 m.

AR information 41 corresponding to the bear 31 object may include animal, bear, and 30 m. In other words, regarding the AR information 41, the type may be stored as animal, the name may be stored as bear, and the distance information from the wearable device 100 to the object may be stored as 30 m. When the wearable device 100 recognizes the bear 31 object, the wearable device 100 may obtain the AR information 41 corresponding to the bear 31 object, and in this case, the AR information 40 may be animal, bear, and 30 m.

AR information 42 corresponding to the vehicle 32 object may include Vehicle, Samsung, and 10 m. In other words, regarding the AR information 42, the type may be stored as vehicle, the name may be stored as Samsung, and the distance information from the wearable device 100 to the object may be stored as 10 m. When the wearable device 100 recognizes the vehicle 32 object, the wearable device 100 may obtain the AR information 42 corresponding to the vehicle 32 object, and in this case, the AR information 42 may be vehicle, Samsung, and 10 m.

AR information 43 corresponding to the building 33 object may include building, abc, and 100 m. In other words, regarding the AR information 43, the type may be stored as building, the name may be stored as abc, and the distance information from the wearable device 100 to the object may be stored as 100 m. When the wearable device 100 recognizes the building 33 object, the wearable device 100 may obtain the AR information 43 corresponding to the building 33 object, and in this case, the AR information 43 may be building, abc, and 100 m.

Referring to FIG. 12, when the focus adjusting element 152 is not provided, the wearable device 100 may display all of the AR information 40, 41, 42, and 43 corresponding to the objects, respectively, sharply regardless of the stored distance information.

However, if the wearable device 100 displays all of the AR information 40, 41, 42, and 43 sharply, the user may experience eyestrain and confusion due to a difference in sense of distance between the object not fixed with the user's gaze and the corresponding AR information. Specifically, if the user's gaze is fixed on the sign at a distance of 20 m from the wearable device 100, the user may see the building 33 at a distance of 100 m from the wearable device 100 blurredly. If the AR information 43 corresponding to the building 33 looks sharply while the building 33 looks blurredly, the user may experience eyestrain and may be confused with the sense of distance.

Therefore, the wearable device 100 may solve the above problem by using the focus adjusting element 152.

FIGS. 13 and 14 are diagrams illustrating embodiments in which the wearable device 100 displays the AR information using the focus adjusting element 152.

Referring to FIGS. 13 and 14, the wearable device 100 may change a size of an image formed on the retina of the user and sharpness of the image using the focus adjusting element 152. The user may see the AR information sharply or blurredly according to a change of the focus adjusting element 152.

FIG. 13 is a diagram illustrating an embodiment of displaying the AR information with two levels of sharpness using the distance information from the wearable device 100 to the object.

Referring to FIG. 13(A), the user's gaze may be fixed on the sign object and the wearable device 100 may control the focus adjusting element 152 to display the AR information 40 corresponding to the sign sharply.

The wearable device 100 may control the focus adjusting element 152 to display the AR information 41, 42, and 43 corresponding to the object not fixed with the user's gaze blurredly.

Herein, the wearable device 100 may control the focus adjusting element 152 to have the same blur level.

Referring to FIG. 13(B), the wearable device 100 may display the AR information corresponding to the object according to the distance information of each object. Herein, the wearable device 100 may display sharpness differently for each AR information. It is assumed that the user's gaze is fixed on the sign. In addition, as assumed above with reference to FIG. 12, the distance to the sign may be 20 m, the distance to the bear may be 30 m, the distance to the vehicle may be 10 m, and the distance to the building may be 100 m.

In this case, the wearable device 100 may identify the distance information of each object and identify a focal length difference. The focal length difference may refer to a difference between a distance from the wearable device 100 to a position of the user's gaze and a distance from the wearable device 100 to the object. The wearable device 100 may control the focus adjusting element 152 using the focal length difference.

Since the user's gaze is fixed on the sign and the sign is separated from the wearable device 100 by 20 m, a standard of the focal length difference may be 20 m. A difference in distance between the sign and the focal point is 0 m, and accordingly, the focal length difference of the sign may be 0. A difference in distance between the bear and the focal point is 10 m, and accordingly, the focal length difference of the bear may be 10. In addition, a difference in distance between the vehicle and the focal point is −10 m, and accordingly, the focal length difference of the vehicle may be −10. Further, a difference in distance between the building and the focal point is 100 m, and accordingly, the focal length difference of the building may be 100.

The wearable device 100 may control the focus adjusting element 152 to display the AR information with different sharpness using the focal length difference. Referring to FIG. 13, when the focal length difference is 0, the wearable device 100 may sharply display the AR information corresponding to corresponding object. When the focal length difference is not 0, the wearable device 100 may display the AR information corresponding to the corresponding object blurredly at the same level (blur level 1 in FIG. 13(B)).

Meanwhile, the wearable device 100 may display different sharpness for each object using the focal length difference and may display the AR information of the objects, as illustrated in FIG. 13(A). Specifically, when the refractive index of the focus adjusting element 152 included in the wearable device 100 is changed, the focal length of the output light may change. When the focal length changes according to the changed refractive index of the focus adjusting element 152, the user may recognize the sharpness of the AR information corresponding to the object differently.

Referring to FIG. 13(A), the wearable device 100 may sharply display the AR information 40 corresponding to the sign object having the focal length difference of 0. The wearable device 100 may display the AR information 41, 42, and 43 corresponding to the objects having the focal length difference, which is not 0, at blur level 1.

Meanwhile, FIG. 14 is a diagram illustrating an embodiment of displaying the AR information at a plurality of levels of sharpness using the distance information from the wearable device 100 to the object. Herein, the distance information may refer to a distance from the wearable device 100 to the object.

As described above with reference to FIG. 13, the wearable device 100 may obtain the focal distance difference of each object. In FIG. 13, the sharpness is divided into two by dividing the object with the focal length difference of 0 and the object with the focal length difference, which is not 0, but referring to FIG. 14, the sharpness may be specifically divided by dividing the focal length difference in a certain unit.

For example, as illustrated in FIG. 14(B), if the focal length difference (absolute value) is 0 to 5, the sharpness may be identified as clear, if the focal length difference is 6 to 30, the sharpness may be identified as blur level 1, if the focal length difference is 31 to 50, the sharpness may be identified as blur level 2, and if the focal length difference is 51 to 100, the sharpness may be identified as blur level 3. Herein, a higher number of level may correspond to the sharpness with blur. When the focal length difference (absolute value) is greater than 100, the sharpness may be identified as none and may be set to not display the AR information at all. Herein, the wearable device 100 may control the focus adjusting element 152 or control the light emitting element 151 to not display the AR information at all.

Herein, the reason for using the focal length difference as an absolute value is because a difference in distance between the focal point (gaze) and the object is actually meaningful, and a difference between a negative value of the distance difference and a positive value of the distance difference may not be generally distinguishable by the user. However, in actual implementation, the sharpness may be set different in order to distinguish the negative value of the distance difference from the positive value of the distance difference.

Meanwhile, as the control method according to another embodiment of the disclosure, if the focal length difference is 100 or greater, the wearable device 100 may control to not generate the AR information.

The wearable device 100 may display the AR information based on the sharpness specified in FIG. 14(B) and this is illustrated in FIG. 14(A).

Referring to FIG. 14(A), the wearable device 100 may display the AR information 40 corresponding to the sign sharply. The wearable device 100 may display the AR information 41 and 42 corresponding to the bear and the vehicle having the sharpness of the blur level 1 blurredly at the level 1. In addition, the wearable device 100 may display the AR information 43 corresponding to the building having the sharpness of a blur level 3 blurredly at the level 3.

In the description with reference to FIGS. 13 and 14, the sharpness is specified with respect to the focal length difference based on certain ranges, but in actual implementation, the wearable device 100 may divide each sharpness according to the value of the focal length difference. For example, when the focal length difference is 1 to 100, the wearable device 100 may identify the sharpness as 1 to 100.

FIGS. 15 to 18 are diagrams illustrating an amount of change of the focus adjusting element according to each embodiment.

FIGS. 15 to 18 are diagrams illustrating an amount of change of the focus adjusting element according to a movement path of the scanning mirror 153. The movement path of the scanning mirror 153 may refer to a path through which light output by the light emitting element 151 and reflected by the scanning mirror 153 is projected.

Referring to FIGS. 15 to 18, it is assumed that 1 second is taken to move from one square to another square horizontally or vertically, for convenience of calculation. In actual implementation, it may took not the same time during the movement from one square to another square and delay may occur in a specific section.

Referring to FIG. 15(A), the wearable device 100 may control the scanning mirror 153 so that the flow path of projected light starts from a lower left end to the right and moves through all sections. In this case, the time taken for the scanning mirror to move to project light to all of the sections may be approximately 168 seconds.

Although the scanning mirror 153 moves to project light to all of the sections, the wearable device 100 may output light through the light emitting element 151, only when displaying the AR information. Accordingly, the wearable device 100 may control the laser projector 150 not to actually project light in a section where the AR information is not displayed.

In this case, the focal length difference of the section not displayed with the AR information may be set to maintain the original focal point. This is for minimizing the change of the focus adjusting element 152 since the section not displayed with the artificial intelligence is not related to the change of the focus adjusting element 152.

The amount of change of the focus adjusting element in the flow path of the scanning mirror 153 according to FIG. 15(A) may be as in FIG. 15(B). The amount of change of the focus adjusting element may be identified by the amount of change of the focal length difference.

Referring to FIG. 15(B), the focal length difference may be repeatedly changed between 40 seconds to 100 seconds. The time unit has been described above as a unit of one second, for convenience of calculation, but the time unit in practice may be implemented as 10^-3s or 10^-6s. Accordingly, when the focal length difference is repeatedly changed during a short period of time, the focus adjusting element 152 also has to be changed during a short period of time. In such a case, the wearable device 100 may essentially use high-speed focus adjusting element 152.

Referring to FIG. 16(A), a start position of the projection of light is a lower left end, and the movement path may reciprocate vertically to project light to all of sections. As described above with reference to FIG. 15(A), it may take 168 seconds until the scanning mirror 153 finishes all of the movement.

When the amount of change of the focus adjusting element 152 is identified according to FIG. 16(A), it may be the same as illustrated in FIG. 16(B).

Referring to FIG. 16(B), it may be confirmed that the focal length difference is changed during a short period of time in the vicinity of 120 seconds, and the wearable device 100 may have to use the high-speed focus adjusting element 152.

FIG. 17(A) is a diagram illustrating an embodiment in which the wearable device 100 controls the movement path of the scanning mirror 153 to minimize the amount of change of the focus adjusting element 152. The wearable device 100 may control the scanning mirror 153 to not project light to the entire path but to project light only to a necessary portion, unlike in FIGS. 15 and 16.

In order to minimize the amount of change of the focus adjusting element 152, the wearable device 100 may move the scanning mirror 153 for each region with the same focal length difference. In addition, the wearable device 100 may move the scanning mirror 153 from a portion with a small focal length difference to a portion with a great focal length difference or from a portion with a great focal length difference to a portion with a small focal length difference. In this case, a total movement time may be 59 seconds.

When controlling the scanning mirror 153 along the movement path of FIG. 17(A), the amount of change of the focus adjusting element 152 may be the same as in FIG. 17(B). Referring to FIG. 17(B), the focal length difference may be changed at a specific time. However, the focal adjusting element 152 may not be repeatedly changed, since the focal length difference changed once is maintained. For example, in the embodiment of FIG. 17, the wearable device 100 may use the normal focus adjusting element without using the high-speed focus adjusting element. In this case, the cost of components of the wearable device 100 may be reduced.

FIG. 18(A) is a diagram illustrating an embodiment in which the wearable device 100 controls the scanning mirror 153 to minimize the movement path of the scanning mirror 153. In order to minimize the movement path of the scanning mirror 153, the wearable device 100 may consider only the region displayed with the AR information simply, regardless of the change of the focus adjusting element 152. In this case, the total time required may be 57 seconds.

When controlling the scanning mirror 153 in the movement path according to FIG. 18(A), the amount of change of the focus adjusting element 152 may be the same as in FIG. 18(B). Referring to FIG. 18(B), the focal length difference may be changed at a specific time. However, the focal adjusting element 152 may not be repeatedly changed, since the focal length difference changed once is maintained. In this case, since the focus adjusting element 152 is not repeatedly changed during a short period of time, the wearable device 100 may use the normal focus adjusting element 152, and this may lead to cost reduction.

In a case of FIG. 18(B), the movement path of the scanning mirror 153 was not controlled in the order from a small focal length difference to a great focal length difference, and the scanning mirror 153 was controlled only to minimize the movement path of the scanning mirror 153. Accordingly, a degree of change of the focus adjusting element 152 may be greater than in the embodiment of FIG. 17.

The wearable device 100 may control the movement path of the scanning mirror 153 to minimize the amount of change of the focus adjusting element 152 and may control the movement path of the scanning mirror 153 to minimize the movement path of the scanning mirror 153.

Meanwhile, in actual implementation, the wearable device 100 may control the scanning mirror 153 to select an optimal method by identifying both cases described above. The wearable device 100 may apply a weight to a main item to select an optimal method automatically. In addition, in actual implementation, the wearable device 100 may provide a UI for guiding the user to select one of various methods.

Meanwhile, the wearable device 100 may have to select any one of the two methods. In this case, since a driving speed of the focus adjusting element 152 may be lower than a driving speed of the scanning mirror 153, the usage of the method for minimizing the amount of change of the focus adjusting element 152 may be effective than the method for minimizing the movement path of the scanning mirror 153.

FIG. 19 is a flowchart illustrating a method for controlling a wearable device according to an embodiment.

Meanwhile, according to an embodiment of the disclosure, in a method for controlling a wearable device including a laser projector including a light emitting element configured to emit laser light, a focus adjusting element configured to adjust a focal point of the emitted laser light, and a scanning mirror configured to control a scanning direction of the light with the adjusted focal point, the user's gaze may be identified based on sensing data obtained by a sensor (S1905).

In addition, location information of at least one object included in an image obtained by a camera may be identified (S1910).

In addition, a driving state of the focus adjusting element may be controlled based on the identified user's gaze and location information of the object (S1915).

In addition, augmented reality (AR) information related to the object may be provided on a display based on the identified user's gaze and location information of the object (S1920).

Herein, the step S1915 may include identifying whether the location of the object corresponds to the user's gaze by comparing the user's gaze with the location information of the object, and controlling a driving state of the focus adjusting element based on the identified result.

In addition, the step S1920 may include, based on the location of the object corresponding to the location of the user's gaze, providing AR information related to the object on the display by controlling a focal length of the focus adjusting element to be a first focal length, and based on the location of the object not corresponding to the location of the user's gaze, providing the AR information related to the object on the display by controlling the focal length of the focus adjusting element to be a second focal length.

Herein, the first focal length may be a unique focal length of the focus adjusting element and the second focal length may be different from the unique focal length.

In addition, the method for controlling the wearable device may further include identifying location information of each of a plurality of objects included in the obtained image, and the controlling the driving state of the focus adjusting element may include, based on first AR information related to a first object corresponding to the location of the user's gaze among the plurality of objects being provided, controlling the focal length of the focus adjusting element to be the first focal length, and based on second AR information related to a second objet not corresponding to the location of the user's gaze among the plurality of objects being provided, controlling the focal length of the focus adjusting element to be the second focal length.

The step S1915 may include, based on the second AR information being provided, controlling the focal length of the focus adjusting element to be the second focal length based on depth information of the second object.

The step S1915 may include obtaining a difference between a depth value included in the depth information of the second object and a depth value corresponding to the identified user's gaze, and controlling the focal length of the focus adjusting element to be the second focal length based on the obtained difference of depth values.

The control method may further include, based on the plurality of objects being included in the obtained image, controlling the scanning mirror by determining at least one of a scanning start location, a scanning direction, and a scanning path based on the location information of each of the plurality of objects.

The controlling the scanning mirror may include determining at least one of the scanning start location, the scanning direction, and the scanning path to change the focal length of the focus adjusting element in phases based on the location information of each of the plurality of objects.

The controlling the scanning mirror may include determining at least one of the scanning start location, the scanning direction, and the scanning path to minimize a rotation operation of the scanning mirror based on the location information of each of the plurality of objects.

The method for controlling the wearable device as in FIG. 19 may be executed on the wearable device having the configuration of FIG. 5 and may also be executed on a wearable device having other configurations.

Meanwhile, the methods according to the embodiments of the disclosure described above may be implemented in a form of an application installable on the wearable device of the related art.

In addition, the methods according to the embodiments of the disclosure described above may be implemented simply by the software upgrade or hardware upgrade in the wearable device of the related art.

Further, the embodiments of the disclosure described above may be performed through an embedded server provided in the electronic device or an external server of the electronic device.

Meanwhile, the method for controlling the wearable device according to the embodiment may be implemented as a program and provided in the wearable device. In particular, the program including the method for controlling the wearable device may be stored and provided in a non-transitory computer-readable medium.

In addition, the embodiments described above may be implemented in a recording medium readable by a computer or a similar device using software, hardware, or a combination thereof. According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. In some cases, the embodiments described in this specification may be implemented as a processor 140 itself. According to the implementation in terms of software, the embodiments such as procedures and functions described in this specification may be implemented as separate software modules. Each of the software modules may perform one or more functions and operations described in this specification.

Computer instructions for executing processing operations on the wearable device according to the embodiments of the disclosure descried above may be stored in a non-transitory computer-readable medium. When the computer instructions stored in such a non-transitory computer-readable medium are executed by the processor, the computer instructions may enable a specific machine to execute the processing operations on the wearable device according to the embodiments described above.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A wearable device comprising:
   a camera;
   a sensor;
   a light emitting element;
   a scanning mirror configured to reflect light output from the light emitting element to project a light at a specific location,
   a display;
   a focus adjusting element; and
   a processor configured to,
   identify a user's gaze based on sensing data obtained by the sensor,
   identify a location of a first object and a location of a second object, the first object and the second object being included in an image obtained by the camera,
   identify whether the location of the first object and the location of the second object corresponds to the identified user's gaze by comparing the user's gaze with the location of the first object and the location of the second object,
   control the light emitting element to provide first augmented reality (AR) information related to the first object and second AR information related to the second object based on the identified user's gaze and the location of the first object and the location of the second object, based on the location of the first object corresponding to the user's gaze, provide the first AR information related to the first object by controlling a focal length of the focus adjusting element to be a first focal length, based on the location of the second object not corresponding to the user's gaze, provide the second AR information related to the second object by controlling the focal length of the focus adjusting element to be a second focal length, wherein the first focal length is a unique focal length of the focus adjusting element, wherein the focus adjusting element is disposed between the light emitting element and the scanning mirror, wherein the second focal length is different from the unique focal length, control the first focal length and the second focal length of the focus adjusting element such that light corresponding to a pixel of the first AR information or light corresponding to a pixel of the second AR information is formed on a user's retina, wherein a size of the light corresponding to the pixel of the second AR information is larger than a size of the light corresponding to the pixel of the first AR information, determine a scanning start location, a scanning direction, and a scanning path to minimize a rotation operation of the scanning mirror based on the location of the first object and the location of the second object, control the scanning mirror based on the determined scanning start location, the determined scanning direction, and the determined scanning path, and based on the location of the first object corresponding to the identified user's gaze and the location of the second object not corresponding to the identified user's gaze:

determine a first focal length difference of the first object as a difference between a distance from the wearable device to a position of the user's gaze and a distance from the wearable device to the first object, determine a second focal length difference of the second object as a difference between the distance from the wearable device to the position of the user's gaze and a distance from the wearable device to the second object, control the display to display the first AR information at a first blur level corresponding to the first focal length difference, and control the display to display the second AR information at a second blur level higher than the first blur level corresponding to the second focal length difference.

2. The wearable device according to claim 1, wherein the processor is further configured to:

based on the first AR information when the first object corresponds to the user's gaze, control the focal length of the focus adjusting element to be the first focal length; and based on the second AR information when the second object does not correspond to the user's gaze, control the focal length of the focus adjusting element to be the second focal length.

3. The wearable device according to claim 2, wherein the processor is further configured to, based on the second AR information, control the focal length of the focus adjusting element to be the second focal length based on depth information of the second object.

4. The wearable device according to claim 3, wherein the processor is further configured to:

obtain a difference between a depth value included in the depth information of the second object and a depth value corresponding to the identified user's gaze; and control the focal length of the focus adjusting element to be the second focal length based on the obtained difference of depth values.

5. The wearable device according to claim 1, wherein the processor is further configured to determine the scanning start location, the scanning direction, and the scanning path so that the focal length of the focus adjusting element is changed in phases based on the location of the first object and the location of the second object.

6. A method for controlling a wearable device comprising a light emitting element, a focus adjusting element and scanning mirror reflecting light output from the light emitting element to project a light at a specific location, the method comprising:

identifying a user's gaze based on sensing data obtained by a sensor, identifying a location of a first object and a location of a second object, the first object and the second object being included in an image obtained by a camera, identifying whether the location of the first object and the location of the second object corresponds to the identified user's gaze by comparing the user's gaze with the location of the first object and the location of the second object, displaying first augmented reality (AR) information related to the first object and second AR information related to the second object based on the identified user's gaze and the location of the first object and the location of the second object, based on the location of the first object corresponding to the user's gaze, displaying the first AR information related to the first object by controlling a focal length of the focus adjusting element to be a first focal length, based on the location of the second object not corresponding to the user's gaze, displaying the second AR information related to the second object by controlling the focal length of the focus adjusting element to be a second focal length, wherein the first focal length is a unique focal length of the focus adjusting element, wherein the focus adjusting element is disposed between the light emitting element and the scanning mirror, wherein the second focal length is different from the unique focal length, controlling the first focal length and the second focal length of the focus adjusting element such that light corresponding to a pixel of the first AR information or light corresponding to a pixel of the second AR information is formed on a user's retina, wherein a size of the light corresponding to the pixel of the second AR information is larger than a size of the light corresponding to the pixel of the first AR information, determining a scanning start location, a scanning direction, and a scanning path to minimize a rotation operation of the scanning mirror based on the location of the first object and the location of the second object, controlling the scanning mirror based on the determined scanning start location, the determined scanning direction, and the determined scanning path, and based on the location of the first object corresponding to the identified user's gaze and the location of the second object not corresponding to the identified user's gaze:

determining a first focal length difference of the first object as a difference between a distance from the wearable device to a position of the user's gaze and a distance from the wearable device to the first object, determining a second focal length difference of the second object as a difference between the distance from the wearable device to the position of the user's gaze and a distance from the wearable device to the second object, displaying the first AR information at a first blur level corresponding to the first focal length difference, and displaying the second AR information at a second blur level higher than the first blur level corresponding to the second focal length difference.

7. The method according to claim 6, further comprising:

wherein the controlling the focal length of the focus adjusting element further comprises:

based on the first AR information when the first object corresponds to the user's gaze, controlling the focal length of the focus adjusting element to be the first focal length; and based on the second AR information when the second object does not correspond to the user's gaze, controlling the focal length of the focus adjusting element to be the second focal length.

* * * * *